(12) United States Patent
Ichikawa

(10) Patent No.: US 9,350,531 B2
(45) Date of Patent: May 24, 2016

(54) COMMUNICATION DEVICE, CONTROL SIGNAL GENERATION METHOD, SHUTTER GLASSES, AND COMMUNICATION SYSTEM

(75) Inventor: Takeshi Ichikawa, Kanagawa (JP)

(73) Assignee: LAPIS SEMICONDUCTOR CO., LTD., Yokohama (JP)

( * ) Notice: Subject to any disclaimer, the term of this patent is extended or adjusted under 35 U.S.C. 154(b) by 690 days.

(21) Appl. No.: 13/436,939

(22) Filed: Mar. 31, 2012

(65) Prior Publication Data

US 2012/0249760 A1 Oct. 4, 2012

(30) Foreign Application Priority Data

Mar. 31, 2011 (JP) .................................. 2011-078041

(51) Int. Cl.
| | | |
|---|---|---|
| *H04N 13/04* | (2006.01) | |
| *H04L 7/04* | (2006.01) | |
| *H04L 1/18* | (2006.01) | |
| *H04L 7/08* | (2006.01) | |
| *H04L 1/00* | (2006.01) | |

(52) U.S. Cl.
CPC ................ *H04L 7/04* (2013.01); *H04L 1/1822* (2013.01); *H04L 1/1893* (2013.01); *H04N 13/0438* (2013.01); *H04L 1/0045* (2013.01); *H04L 1/0061* (2013.01); *H04L 7/08* (2013.01)

(58) Field of Classification Search
CPC ........... G02B 27/2228; H04N 13/0438; H04N 13/0497; H04N 13/0429; H04N 13/0059
See application file for complete search history.

(56) References Cited

U.S. PATENT DOCUMENTS

| | | | |
|---|---|---|---|
| 6,324,178 B1* | 11/2001 | Lo ........................... | H04L 29/06 370/392 |
| 7,233,588 B1* | 6/2007 | Stratigakis ..................... | 370/350 |
| 2003/0216139 A1* | 11/2003 | Olson et al. ................... | 455/419 |
| 2004/0010799 A1* | 1/2004 | Jang ................................. | 725/58 |
| 2006/0241798 A1* | 10/2006 | Watanabe et al. ............... | 700/94 |
| 2010/0295929 A1 | 11/2010 | Yoshifuji et al. | |

(Continued)

FOREIGN PATENT DOCUMENTS

| | | |
|---|---|---|
| JP | 06-223035 A | 8/1994 |
| JP | 2000-132325 A | 5/2000 |
| JP | 2009-021753 A | 1/2009 |

(Continued)

OTHER PUBLICATIONS

Japanese Office Action dated Dec. 24, 2014.

(Continued)

*Primary Examiner* — Huy T Nguyen
(74) *Attorney, Agent, or Firm* — Rabin & Berdo, P.C.

(57) ABSTRACT

A communication device allows control of a device to be controlled such as a display device based on reference timing acquired from reception data without delay and with low power consumption. A method for generating a control signal for controlling the device to be controlled, shutter glasses, and a communication system having the corresponding features are also disclosed. The communication device includes a timing signal identifying part which identifies whether or not a predetermined reference signal pattern exist in data incoming intermittently, and a control signal generating part which generates a control signal for the device to be controlled when the existence of the predetermined signal pattern is identified by the timing signal identification part, and a controller which performs the control of the communication device.

17 Claims, 18 Drawing Sheets

(56) References Cited

U.S. PATENT DOCUMENTS

2011/0149779 A1* 6/2011 Richards et al. ............. 370/252
2014/0022361 A1   1/2014 Yoshifuji et al.

FOREIGN PATENT DOCUMENTS

JP   2010-062767 A   3/2010
JP   2010-117437 A   5/2010
JP   2010-268448 A   11/2010

OTHER PUBLICATIONS

Office Action issued by Japanese Patent Office on Jun. 9, 2015.

* cited by examiner

COMMUNICATION DEVICE, CONTROL SIGNAL GENERATION METHOD, SHUTTER GLASSES, AND COMMUNICATION SYSTEM

BACKGROUND OF THE INVENTION

1. Field of the Invention

The present invention relates to a communication device which controls a device to be controlled based on reference timing that is acquired from reception data, a generation method of a control signal for controlling the device to be controlled, shutter glasses which open and close shutters based on reference timing that is acquired from reception data, and a communication system which transmits and receives data that indicates reference timing.

2. Description of the Related Art

In a 3D video display system, a 3D-capable television apparatus and 3D glasses, or shutter glasses, communicate with each other so that the operation timing of the 3D-capable television apparatus will coincide with that of the 3D glasses. FIG. 1 schematically shows a conventional wireless communication system that is applicable to such a 3D video display system.

A transmitter 1 includes at least a control device 3 and a communication device 4. The control device 3 periodically generates data to be transmitted to a receiver 2, and generates a data transmission command for the communication device 4. The data to be transmitted includes data that indicates reference timing. The control device 3 also performs transmission and reception control on packets including data on the communication device 4. The communication device 4 transmits and receives packets through an antenna 4a according to commands from the control device 3.

The receiver 2 includes at least a communication device 5 and a display device 6. The communication device 5 receives transmission packets from the transmitter 1 through an antenna 5a. The communication device 5 extracts reception data from the packets and, if the data indicates reference timing, supplies a control signal synchronous with the detection of the reference timing to the display device 6. The display device 6 is a device that provides a display in synchronization with the reference timing transmitted from the transmitter 1. The display device 6 performs a display operation according to the control signal supplied from the communication device 5.

The operation of the transmitter 1 will be described. In the transmitter 1, a built-in timer (not shown) of the control device 3 measures predetermined cycles (interval period). When the measurement is completed, the control device 3 composes a transmission packet, issues a transmission command to the communication device 4, and transfers the transmission packet to the communication device 4. Receiving the transmission command and transmission packet from the control device 3, the communication device 4 modulates the transmission packet and sends out the resulting digital signal as an RF signal of a predetermined frequency.

Next, the operation of the receiver 2 will be described. In the receiver 2, a built-in timer of the communication device 5 measures predetermined cycles. When the measurement is completed, the communication device 5 receives the RF signal sent from the transmitter 1. The communication device 5 demodulates a reception signal corresponding to the RF signal into a digital signal, and extracts data in the packet from the digital signal.

The communication device 5 includes a control circuit that performs transmission and reception control of the communication device. When packet reception is completed, the control circuit analyzes the data in the packet and, if the data is determined to be destined to the own circuit, outputs a control signal for controlling the display device 6.

As shown in FIG. 2, in the transmitter 1, the aforementioned built-in timer of the control device 3 counts predetermined cycles (interval period). Each time the counting is completed, the transmitter 1 starts to transmit a packet that includes data notifying of the completion of the interval period. The receiver 2 receives the packet and, after a lapse of processing time of the foregoing control circuit, performs control on the display device 6 according to the data in the packet.

If such a wireless communication system is applied to a 3D video display system, the transmitter 1 is implemented on the 3D-capable television apparatus and the receiver 2 is implemented on the 3D glasses. The display device 6 corresponds to liquid crystal display devices of the 3D glasses (see Patent Literature 1). The transmitter 1 inserts a synchronization signal pattern that represents a synchronization signal into the packet as data to be transmitted. The control circuit discriminates the synchronization signal pattern by data analysis. When the result of data analysis shows that the packet data contains a synchronization signal pattern, the control circuit in the communication device 5 assumes the point in time to be the time of occurrence of a synchronization signal. As shown by full lines in FIG. 3, the control circuit generates a left shutter open/close signal and a right shutter open/close signal of the 3D glasses as respective control signals. The 3D glasses have liquid crystal shutters at positions where corresponding to right and left lenses of ordinary glasses. The right and left liquid crystal shutters can be individually opened and closed in response to the right shutter open/close signal and the left shutter open/close signal, respectively, which allows functioning as a pair of 3D glasses.

PATENT LITERATURE

PTL 1: Japanese Patent Kokai No. 2010-117437
PTL 2: Japanese Patent Kokai No. H6-223035

SUMMARY OF THE INVENTION

Technical Problem

In the conventional wireless communication system, the display device 6 is controlled with reference to the point in time when the control circuit in the communication device 5 completes analyzing data on a reception packet. The processing period (FIG. 2) needed for the control circuit to perform data analysis varies depending on noise contamination and other instabilities during reception and depending on data type. Such variations make it difficult to generate control signals including the shutter open/close signals in strict timing, and there has thus been a problem of delay. For example, in the case of the foregoing 3D glasses, a delay in the timing of the generation of the control signals can displace the opening and closing timing of the liquid crystal shutters as shown by the broken lines in FIG. 3. This causes troubles such as flickering on the 3D picture output from the television screen.

Patent Literature 2 proposes supplying a CPU with excessive power for the sake of CPU acceleration. The application of such a technique to the control circuit of the foregoing conventional wireless communication system, however, causes another problem of unnecessary power consumption. Portable devices such as 3D glasses are often powered by a battery, and a reduction in power consumption is desired.

The present invention has been achieved in view of the foregoing, and an object thereof is to provide a communication device that allows control of a device to be controlled such as a display device based on reference timing acquired from reception data without delay and with low power consumption, a method of generating a control signal for controlling the device to be controlled, shutter glasses that allow opening and closing of shutters based on reference timing acquired from reception data without delay and with low power consumption, and a communication system that allows transmission and reception of data indicating reference timing without delay and with low power consumption.

Solution to Problem

A communication device according to the present invention is a communication device for receiving data incoming intermittently, and comprises: timing signal identification means for identifying whether or not a predetermined reference timing signal pattern is present in the data, control signal generating means for generating a control signal for a device to be controlled when the presence of a predetermined timing signal pattern is identified by the timing signal identification means, and control means for performing a control of the communication device.

A control signal generating method according to the present invention is a control signal generating method in a communication device for receiving data incoming intermittently, for generating a control signal for a device to be controlled, and comprises: a timing signal identification step for identifying whether or not a predetermined timing signal pattern is present in the data while the data is being received; and a control signal generating step for generating a control signal for the device to be controlled when the presence of a predetermined timing signal pattern is identified at the timing signal identification step.

Shutter glasses according to the present invention are shutter glasses having a communicating device for receiving data incoming intermittently, a right eye shutter and a left eye shutter, the communication device including: timing signal identification means for identifying whether or not a predetermined reference timing signal pattern is present in the data, control signal generating means for generating control signals for opening and closing the respective right and left eye shutters when the presence of a predetermined timing signal pattern is identified by the timing signal identification means, and control means for performing a control of the communication device.

A communication system according to the present invention is a communication system that includes: a transmitter for intermittently transmitting data containing a predetermined reference timing signal pattern; and a receiver that includes a communication device for receiving the data, the receiver comprising: timing signal identification means for identifying whether or not a predetermined reference timing signal pattern is present in the data, control signal generating means for generating a control signal for a device to be controlled when a presence of a predetermined timing signal pattern is identified by the timing signal identification means, and control means for performing a control of the communication device.

According to the communication device of the present invention, if the presence of a predetermined reference timing signal pattern in the intermittently incoming data is identified by the timing signal identification means, the control signal for the device to be controlled is generated by the control signal generating means. This enables a delayless control of the device to be controlled such as a display device based on the identification of the presence of the predetermined reference timing signal pattern. Moreover, since the control means that performs control of the communication device need not analyze the data to identify the presence of the reference timing signal pattern in the data, a control circuit such as a high-speed high-load CPU need not be used as the control means. It is therefore possible to reduce the power consumption of the device.

According to the control signal generation method of the present application, if the presence of a predetermined reference timing signal pattern in the intermittently incoming data is identified by the timing signal identification means, the control signal for the device to be controlled is generated. This enables a delayless control of the device to be controlled such as a display device based on the identification of the presence of the predetermined reference timing signal pattern. Moreover, since a high-speed control circuit need not be provided for the step to identify the presence of the reference timing signal pattern in the received packet by data analysis, it is possible to reduce the power consumption of the device.

According to the shutter glasses of the present invention, if the presence of a predetermined reference timing signal pattern in the intermittently incoming data is identified by the timing signal identification means, the control signals for opening/closing each of the right eye shutter and the left eye shutter are generated at timings based on the detection of the presence of the predetermined reference timing signal pattern. The opening and the closing of the respective right and left eye shutters are controlled without any delay by using the timing of the completion of the reception of packets from the transmitter as a reference. Additionally, the control means that performs control of the communication device need not analyze the data to identify the presence of the reference timing signal pattern in the data. Therefore, a control circuit of a high-speed operation need not be used as the control means, it is therefore possible to reduce the power consumption of the device.

According to the communication system of the present invention, in the receiver that receives data intermittently transmitted by a transmitter, if the presence of a predetermined reference timing signal pattern in the data is identified by the timing signal identification means, the control signal for the device to be controlled is generated by the control signal generating means. This enables a delayless control of the device to be controlled such as a display device based on the identification of the presence of the predetermined reference timing signal pattern. Moreover, since the control means that performs control of the communication device need not analyze the data to identify the presence of the reference timing signal pattern in the data, a control circuit such as a high-speed high-load CPU need not be used as the control means. It is therefore possible to reduce the power consumption of the device.

DETAILED DESCRIPTION OF THE INVENTION

Hereinafter, embodiments of the present invention will be described in detail with reference to the drawings.

Figure 1:
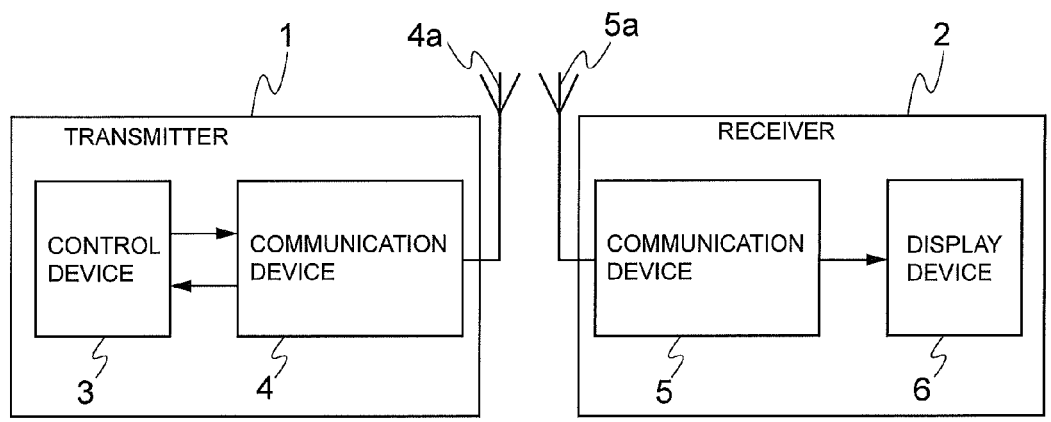
FIG. 1 is a block diagram showing the general configuration of a conventional wireless communication system.
Figure 2:
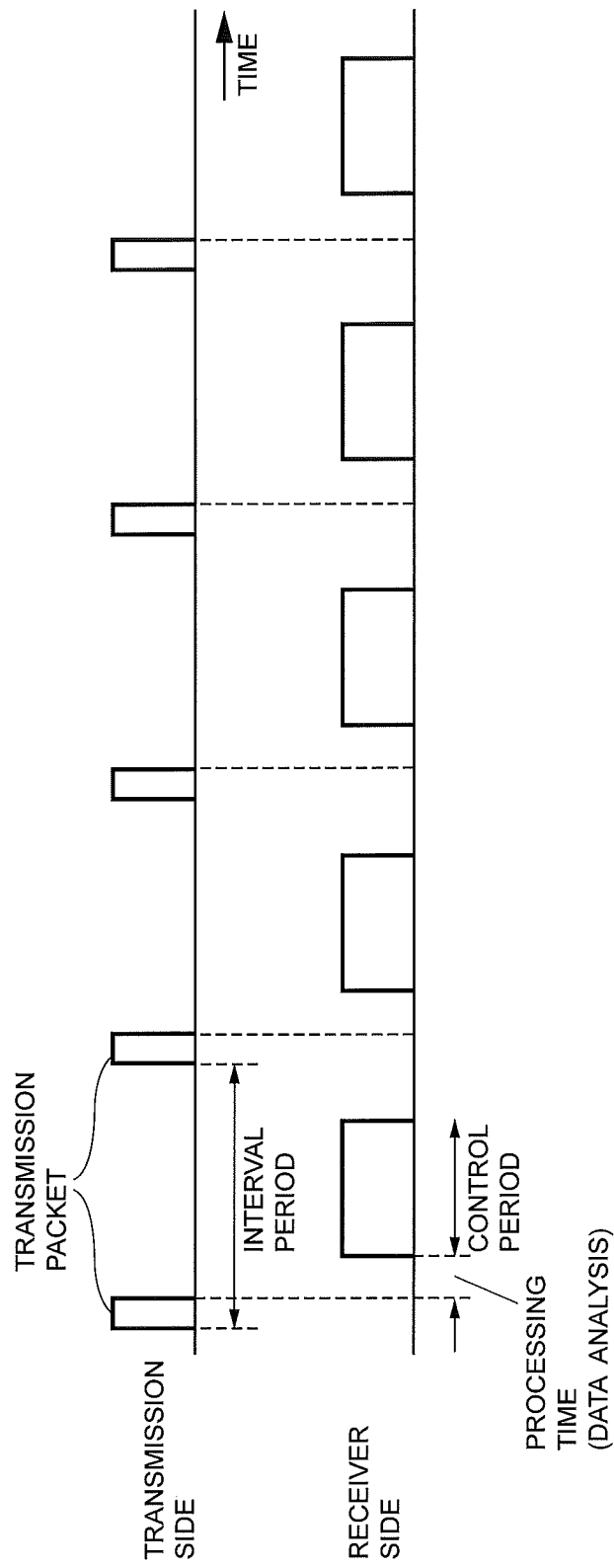
FIG. 2 is a chart showing a timing relationship between transmission packets on a transmission side and operation on a reception side.
Figure 3:
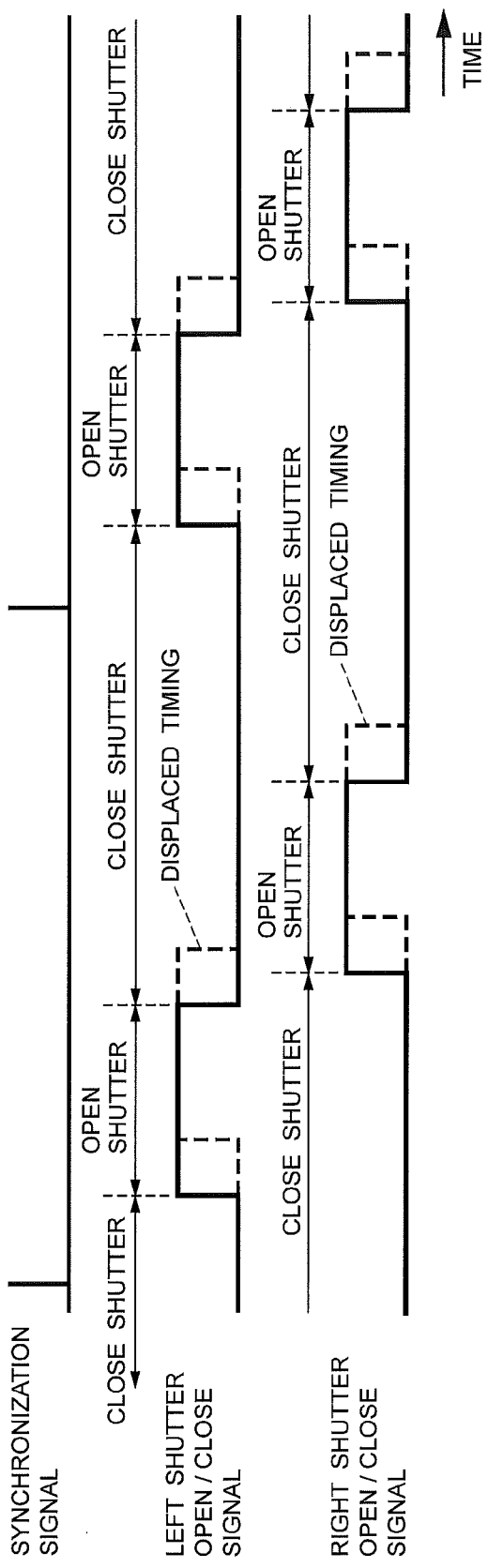
FIG. 3 is a chart showing the open and close timing of shutters in 3D glasses.
Figure 4:
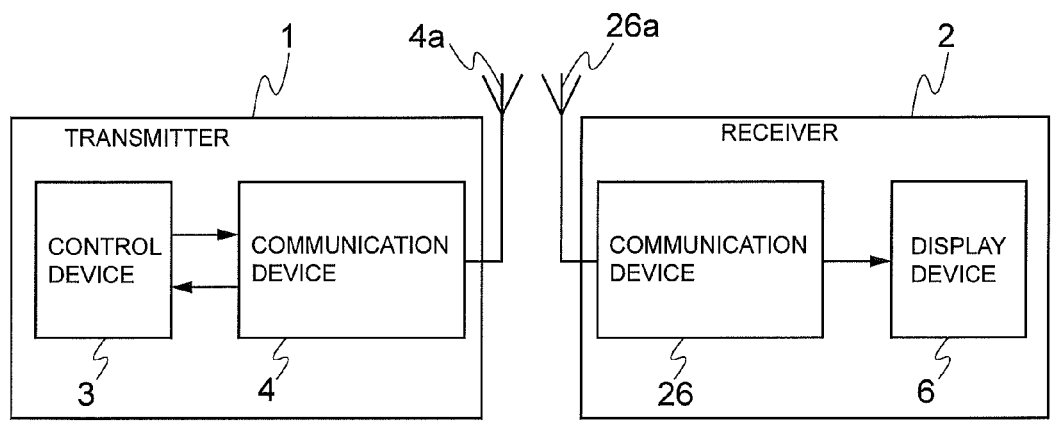
FIG. 4 is a block diagram showing the general configuration of a wireless communication system as a first embodiment of the present invention.

FIG. 4 shows a transmitter 1 and a receiver 2 that constitute a wireless communication system as a first embodiment of the present invention. As in a conventional wireless communication system, the transmitter 1 includes a control device 3 and a communication device 4. The receiver 2 includes a communication device 26, and a display device 6.

Figure 5:
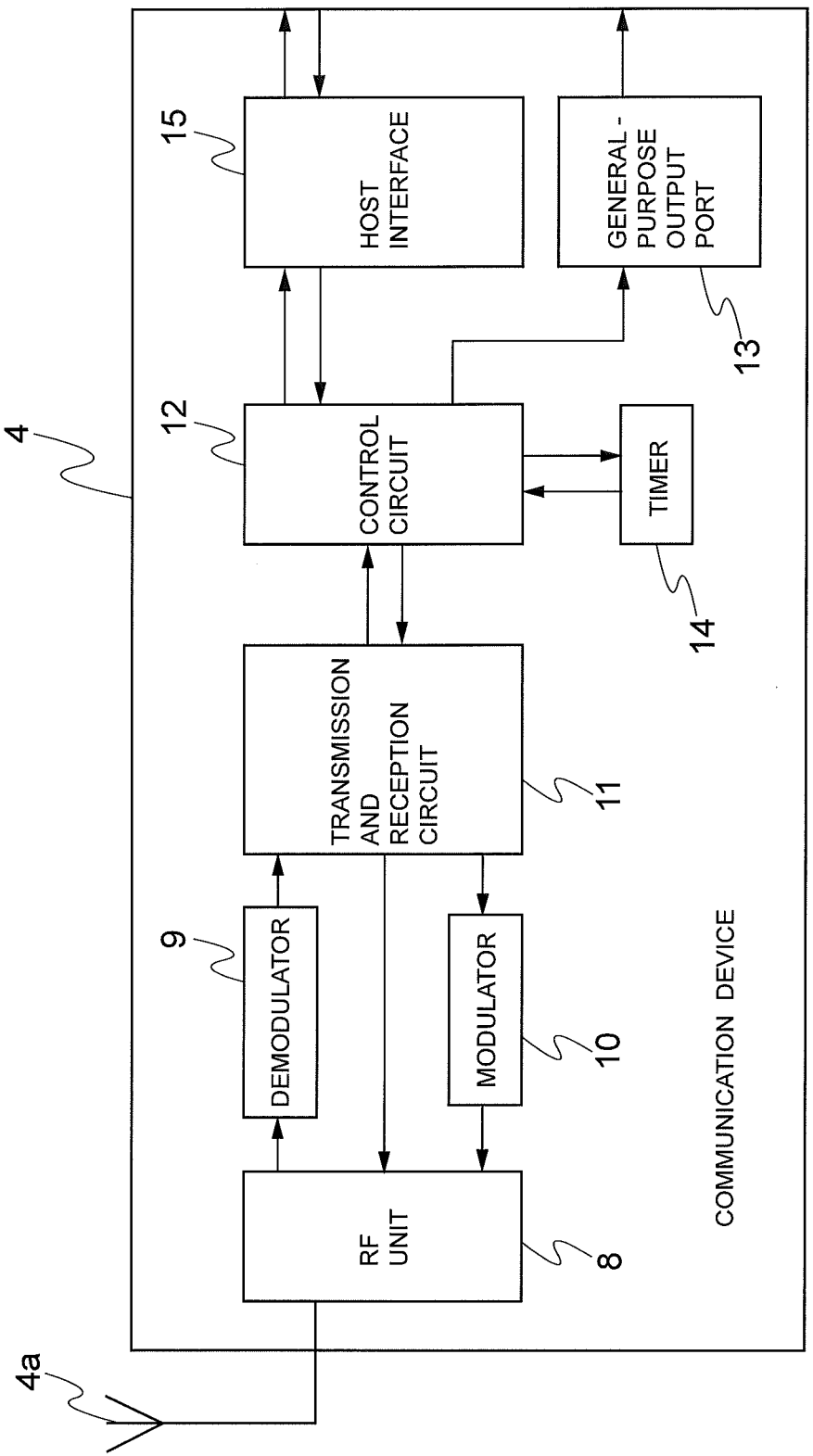
FIG. 5 is a block diagram showing the configuration of a communication device included in the transmitter in the system of FIG. 4.

As shown in FIG. 5, the communication device 4 includes a radio frequency (RF) unit 8, a demodulator 9, a modulator 10, a transmission and reception circuit 11, a control circuit 12, a general-purpose output port 13, a timer 14, and a host interface 15.

The RF unit 8 switches to any one of a transmission state, a reception state, and a stop state according to commands (transmission command, reception command, and stop command) from the transmission and reception circuit 11. At the time of transmission, the RF unit 8 outputs a digital signal input from the modulator 10 as an RF signal (wireless signal) through an antenna 4a. At the time of reception, the RF unit 8 receives an RF signal input from the antenna 4a and outputs the RF signal to the demodulator 9 as a reception signal. The RF unit 8 also switches transmission and reception channels (frequencies) according to a channel switch command from the transmission and reception circuit 11.

The demodulator 9 demodulates the reception signal input from the RF unit 8 into a digital signal (including demodulation packets) and outputs the digital signal to the transmission and reception circuit 11. The modulator 10 modulates transmission packets input from the transmission and reception circuit 11 and outputs the modulated packets to the RF unit 8 for transmission.

The transmission and reception circuit 11, at the time of reception, identifies packets in the digital signal output from the demodulator 9 and extracts data in the packets according to a command from the control circuit 12. At the time of transmission, the transmission and reception circuit 11 generates transmission packets including data to be transmitted, supplied from the control circuit 12, and outputs the transmission packets to the modulation circuit 10 according to a command from the control circuit 12.

The control circuit 12 includes a CPU. The control circuit 12 generates various types of commands for transmission and reception operations, and controls the transmission and reception circuit 11, the general-purpose output port 13, the timer 14, and the host interface 15 in the communication device 4. The control circuit 12 also controls the RF unit 8 through the transmission and reception circuit 11.

The general-purpose output port 13 controls port output including a data supply to a device to be controlled (not shown) according to a command from the control circuit 12. In the present embodiment, no device to be controlled is connected to the general-purpose output port 13 of the communication device 4. This is not restrictive, and a device to be controlled such as a display device may be connected.

The timer 14 counts for a certain time according to a command from the control circuit 12. Upon expiration of the counting, the timer 14 notifies the result to the control circuit 12.

The host interface 15 is an interface circuit for data input and output between the control device 3 and the communication device 4.

Figure 6:
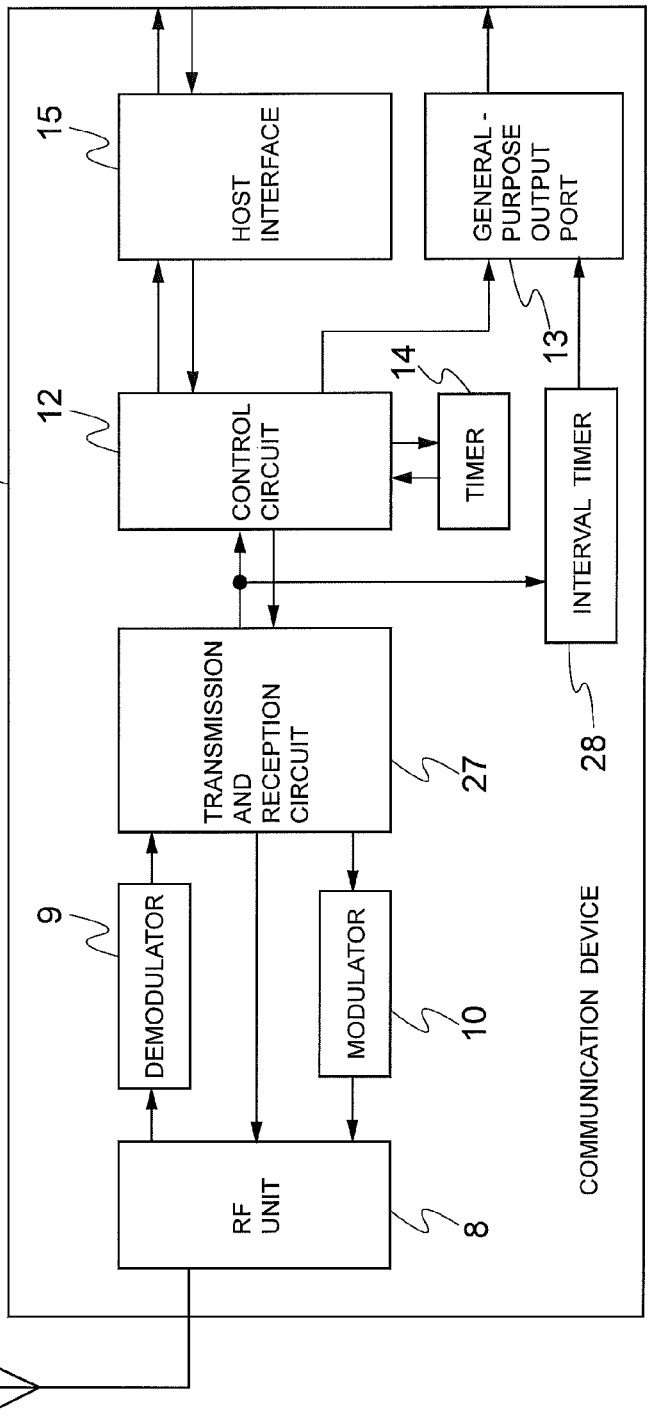
FIG. 6 is a block diagram showing the configuration of a communication device included in the receiver in the system of FIG. 4.

As shown in FIG. 6, the communication device 26 in the receiver 2 includes an RF unit 8, a demodulator 9, a modulator 10, a control circuit 12, a general-purpose output port 13, a timer 14, a host interface 15, a transmission and reception circuit 27, and an interval timer 28. The RF unit 8, the demodulator 9, the modulator 10, the control circuit 12, the general-purpose output port 13, the timer 14, and the host interface 15 are the same as those of the communication device 4 and the explanation thereof will not be repeated. The communication device 26 has an antenna which is designated by the reference numeral 26a.

The communication device 26 is formed as an integral semiconductor chip. A part of the communication device 26, such as the transmission and reception circuit 11 and the control circuit 28, may be formed as an integral semiconductor chip.

Figure 7:
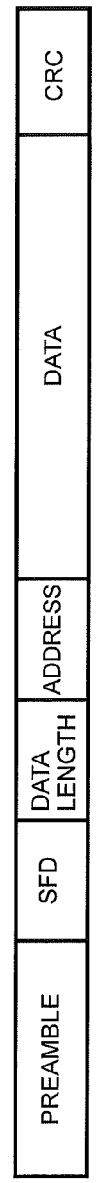
FIG. 7 is a diagram showing a packet structure.

The transmitter 1 and the receiver 2 transmit and receive packets in the form of an RF signal. As shown in FIG. 7, a packet is configured to include a preamble, a start frame delimiter (SFD), a data length, an address, data, and a cyclical redundancy check (CRC) in order from the start. The preamble is a signal pattern that makes the reception side recognize the start of a packet, thereby providing synchronization timing for packet reception. The SFD is an identification bit pattern which comes between the preamble and data. The data length indicates the length of effective data (address, data, and CRC sections) in the packet. The address is a destination address. A source address may also be included. The data is the body of data. As for data type, the data includes a synchronization signal pattern (reference timing signal pattern), a piece of data that indicates the foregoing reference timing. The CRC is a value for checking for errors during packet transmission.

Figure 8:
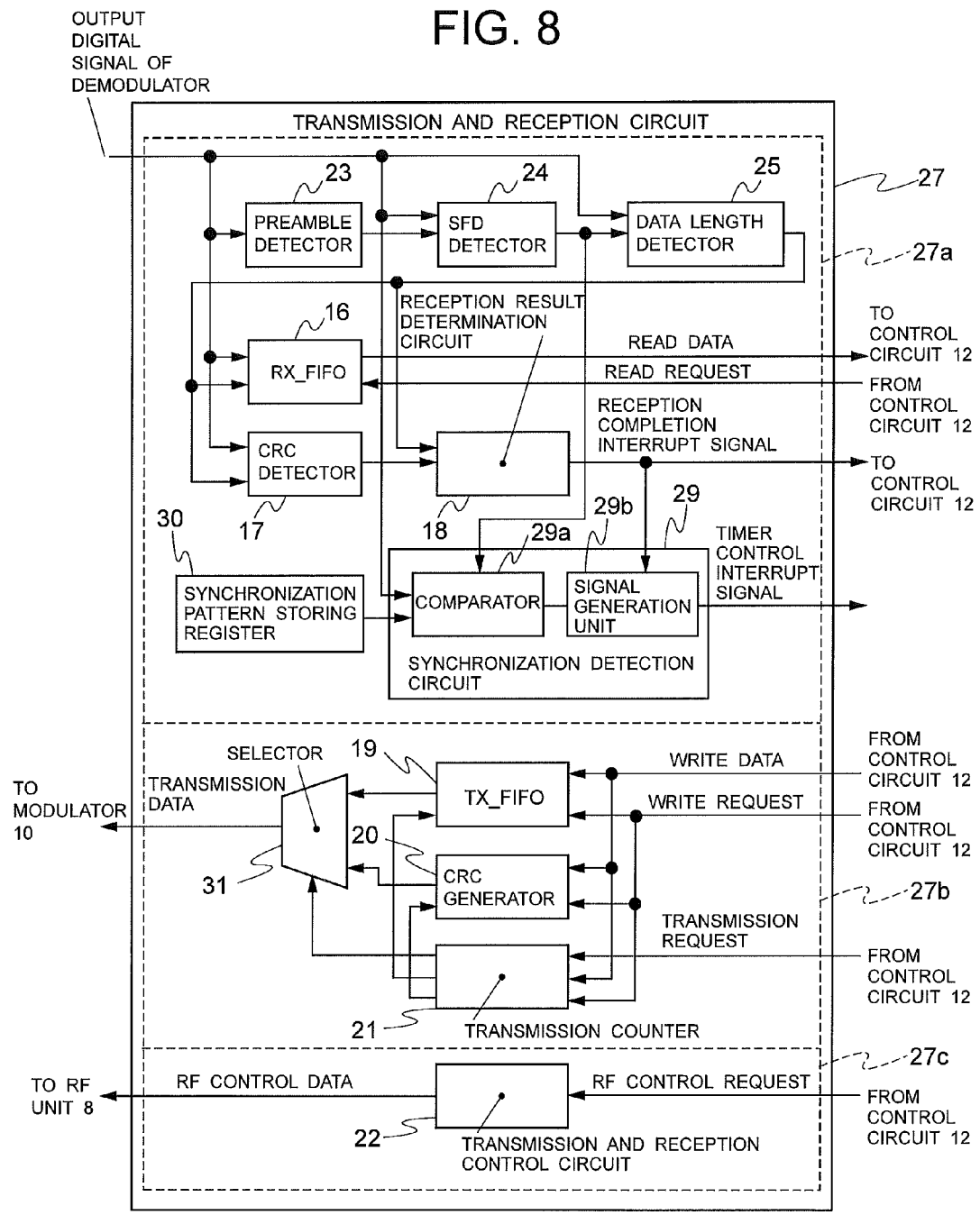
FIG. 8 is a block diagram showing the configuration of a transmission and reception circuit included in the communication device of FIG. 6.

In the communication device 26, the transmission and reception circuit 27 is provided instead of the transmission and reception circuit 11 in the communication device 4. As shown in FIG. 8, the transmission and reception circuit 27 includes a reception system circuit 27a, a transmission system circuit 27b, and an RF control system circuit 27c.

The reception system circuit 27a includes a preamble detector 23, an SFD detector 24, a data length detector 25, an RX_FIFO 16, a CRC detector 17, a reception result determination circuit 18, a synchronization detection circuit 29, and a synchronization pattern storing register 30. The output of the demodulator 9 is connected to the preamble detector 23, the SFD detector 24, the data length detector 25, the RX_FIFO 16, the CRC detector 17, and the synchronization detection circuit 29. The output of the preamble detector 23 is connected to the SFD detector 24. The output of the SFD detector 24 is connected to the data length detector 25. The output of the data length detector 25 is connected to the RX_FIFO 16, the CRC detector 17, and the reception result determination circuit 18.

The preamble detector 23 identifies a preamble pattern in the output digital signal of the demodulator 9. If a preamble is detected, the preamble detector 23 notifies the SFD detector 24 of the detection of the preamble.

Receiving the notification of the detection of the preamble from the preamble detector 23, the SFD detector 24 identifies an SFD pattern in the digital signal output from the demodulator 9. When the SFD detector 24 completes detecting the SFD pattern, the SFD detector 24 notifies the data length detector 25 of the detection of the SFD. The completion of the detection of the SFD pattern means that the preamble and SFD sections of the packet end and an effective data area follows.

The data length detector 25 is a detector that detects the range of an effective data area (effective data length) in a received packet. Receiving the notification of the detection of the SFD from the SFD detector 24, the data length detector 25 detects the subsequent piece of data from the output digital signal of the demodulator 9 as a reception data length. Based on the detection, the data length detector 25 notifies the RX_FIFO 16 and the CRC detector 17 of the start of data reception. After the detection of the data length, the data length detector 25 counts up on each reception of one byte. When data is received as much as the data length, the data length detector 25 notifies the RX_FIFO 16 and the CRC detector 17 of the stop of data reception. The data length detector 25 further notifies the reception result determination circuit 18 of the completion of data reception. As employed herein, the data length is a parameter that indicates the data length of the packet having the structure shown in FIG. 7 excluding the preamble and the SFD (i.e., the address, data, and CRC sections) as described above.

The RX_FIFO 16 is a data retaining unit for storing reception data on the effective data part. When the RX_FIFO 16 receives the notification of the start of data reception which is input from the data length detector 25, the RX_FIFO 16 takes in the output digital signal of the demodulator 9 and starts a data storing operation. When the RX_FIFO 16 receives the notification of the completion of data reception, the RX_FIFO 16 stops the data storing operation. When the RX_FIFO 16 receives a data read command from the control circuit 12, the RX_FIFO 16 sends out the pieces of reception data in succession.

The CRC detector 17 calculates a CRC value of the data input to the RX_FIFO 16 in order to check the reception data. The CRC detector 17 notifies the CRC calculation to the reception result determination circuit 18.

The reception result determination circuit 18 is supplied with the notification of the completion of data reception from the data length detector 25 and the CRC calculation from the CRC detector 17. Receiving the notification of the completion of data reception, the reception result determination circuit 18 determines whether the CRC calculation is correct or wrong. If correct, the reception result determination circuit 18 immediately outputs a reception completion interrupt signal, which indicates the completion of reception of a packet, to the control circuit 12.

A synchronization signal pattern (reference timing signal pattern) is previously stored in a synchronization pattern storing register 30. This synchronization signal pattern is a pattern to be used for identifying that the data in the received packet is a synchronization signal pattern by comparing the data therewith.

The synchronization detection circuit 29 comprises a comparator 29a and a signal generator 29b, and connected to output terminals of the reception result determination circuit 18 and the synchronization pattern register 30 besides the output terminal of the demodulator 9. The comparator 29b performs a synchronization detection by comparison between the output digital signal of the demodulator 9 and the synchronization signal pattern stored in the synchronization pattern storing register 30. Stated another way, it is determined that the synchronization is detected when a pattern identical with the stored synchronization signal pattern is identified in the output digital signal from the demodulator 9. The signal generator 29b in the synchronization detection circuit 29 issues a timer control interrupt signal (timing detection signal) to the interval timer 28 in response to the reception completion interrupt signal of the reception result determination circuit 18 when synchronization is detected by the comparator 29a.

The comparator 29b of the synchronization detection circuit 29 and the synchronization pattern storing register 30 correspond to the timing signal identification means, and the signal generator 29b corresponds to the detection signal generating means. The synchronization pattern storing register 30 corresponds to the reference timing signal pattern storing means, and the comparator 29a corresponds to the comparing means.

The transmission system circuit 27b includes a TX_FIFO 19, a CRC generator 20, a transmission counter 21, and a selector 31.

The TX_FIFO 19 stores transmission data (packet of FIG. 7 excluding the CRC section) which is input through the control circuit 12. The TX_FIFO 19 successively sends the pieces of stored data to the selector 31 in synchronization with an output command which is input from the transmission counter 21.

The CRC generator 20 performs a CRC operation on the data stored in the TX_FIFO 19 excluding the preamble and SFD to obtain a CRC value as a result of operation. The CRC generator 20 performs a CRC operation in response to a CRC operation command from the transmission counter 21, and then sends the operation result to the selector 31.

When a data length is set by the control circuit 12, the transmission counter 21 calculates a preamble area, an SFD area, a length area, a data area, and a CRC area from the timing of issuance of a packet transmission command. The transmission counter 21 issues a data transmission command, the CRC operation command, and a select command to the TX_FIFO 19, the CRC generator 20, and the selector 31 as timing signals upon each packet transmission.

The selector 31 selectively outputs the data sent from the TX_FIFO 19 and the CRC value of the CRC generator 20 to the modulator 10 according to the select command from the transmission counter 21.

The control system circuit 27c includes a transmission and reception control circuit 22. At the time of transmission and reception, the transmission and reception control circuit 22 receives an RF control command input from the control circuit 12, and outputs RF control data (the transmission command, reception command, stop command, and channel switch command of the transmission and reception circuit 11 described above) to the RF unit 8.

Figure 9:
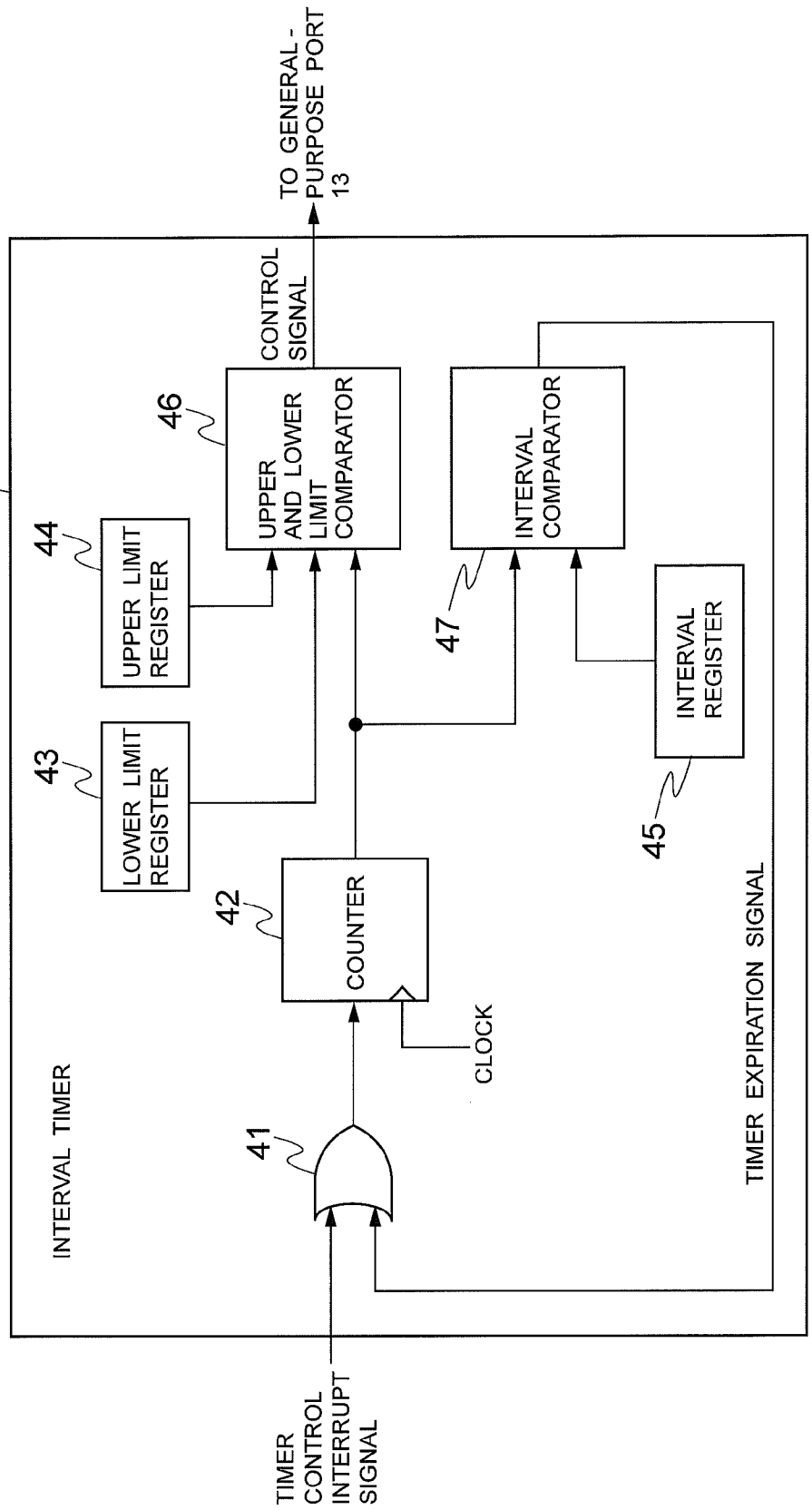
FIG. 9 is a block diagram showing the configuration of an interval timer included in the communication device of FIG. 6.

The interval timer 28 corresponds to control signal generating means, and determines an interval period of a period in which the communication device 26 issues a control signal to the display device 6 in response to the reception of the synchronization signal, and the repetition thereof. As shown in FIG. 9, the interval timer 28 comprises an OR circuit 41, a counter 42, a lower limit register 43, an upper limit register 44, an interval register 45, a upper and lower limits comparator 46, and an interval comparator 47.

The OR circuit 41 outputs ones of the timer interrupt signal from the transmission and reception circuit 27 and a high level output signal (timer expiration signal) of the interval comparator 47 to the counter 42 as a reset signal. When the reset signal is supplied, the counter 42 starts counting of the clock from an initial value (for example, 0) and supplies the count value. The count output of the counter 42 is connected to the upper and lower limits comparator 46 and the interval comparator 47.

The lower limit register 43 and the upper limit register 44 are connected to the upper and lower limits comparator 46. A lower limit value that corresponds to a start time of a period for generating a control signal is held in the lower limit resister 43. An upper limit value that corresponds to an end time of the period for generating the control signal is held in the upper limit register 44. When the count value of the counter 42 is equal to or above the lower limit value, the upper and lower limits comparator 46 generates a high level control signal. When the count value of the counter 42 reaches the upper limit value of the upper limit register, the upper and lower limits comparator 146 stops the generation of the high level control signal, and a low level output is produced. An output signal of the upper and lower limits comparator 46 is supplied to the display device via the general-purpose output port 13.

The interval register 45 is connected to the interval comparator 47. An interval value that is a count value corresponding the repetition frequency of the control signal is held in the interval register 45. When the count value of the counter reaches the interval value of the interval register 45, the interval comparator 47 generates a high level timer expiration signal which is in turn supplied to the OR circuit 41.

Now the operation of the wireless communication system according to the present invention having the structure described so far will be explained.

Figure 10:
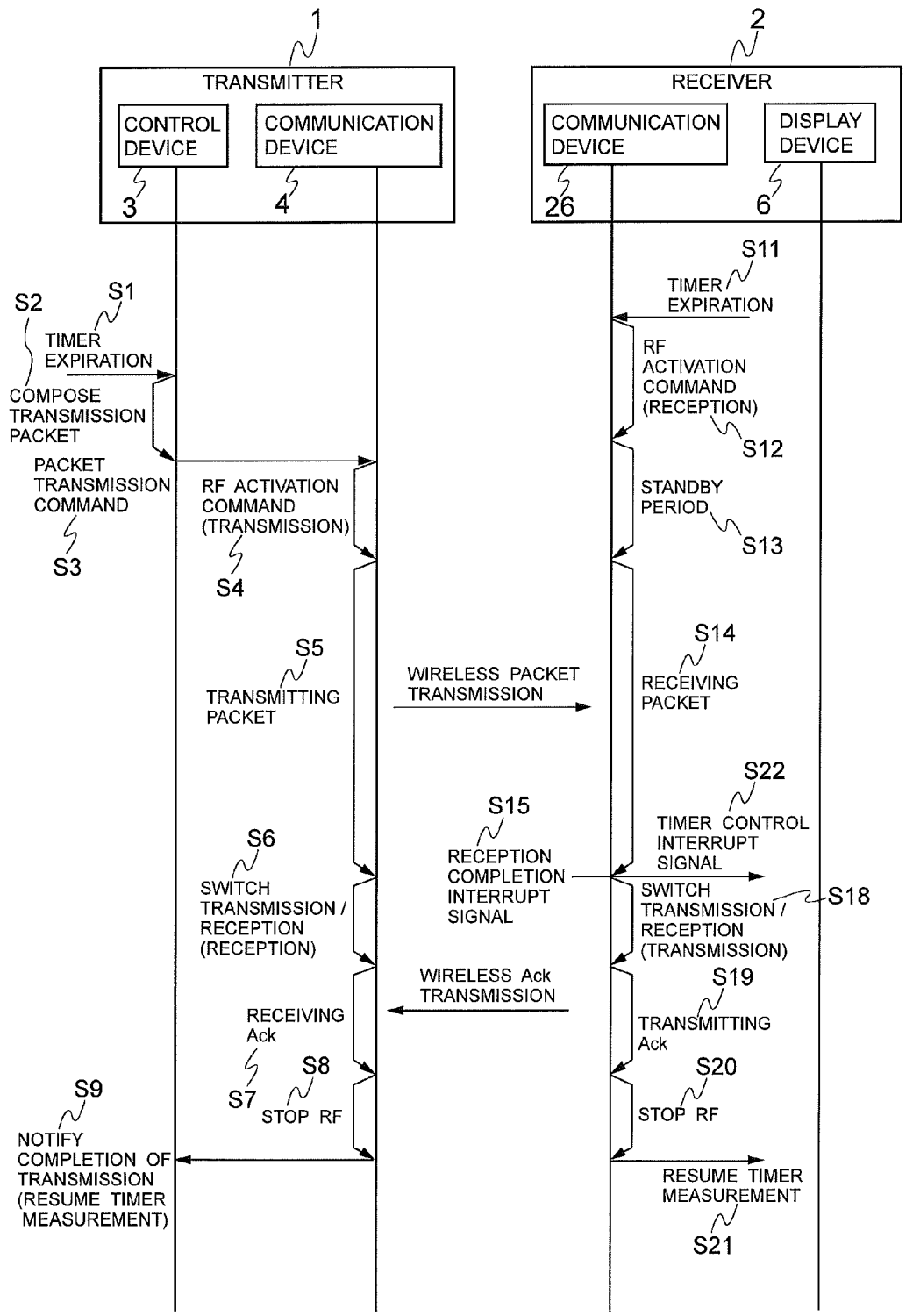
FIG. 10 is a sequence diagram showing the operation of the system of FIG. 4.

As shown in FIG. 10, in the transmitter 1, a built-in timer (not shown) of the control device 3 measures predetermined cycles (interval period). When the measurement is completed (S1), the control device 3 composes a transmission packet without a CRC (S2), issues a transmission command to the communication device 4 (S3), and transfers the transmission packet to the communication device 4. In the communication device 4, the control circuit 12 receives the transmission command and the transmission packet from the control device 3 through the host interface 15. The control circuit 12 issues an RF activation command to the transmission and reception circuit 11 (S4). The transmission and reception circuit 11 activates the RF unit 8 in a transmission state, adds a CRC to the input transmission packet, and outputs the resulting transmission packet to the modulator 10. The modulator 10 modulates the transmission packet, performs RF conversion on the digital signal, and supplies the resulting RF signal to the RF unit 8. The RF unit 8 sends out the RF signal at a predetermine frequency (S5).

Completing the transmission of the RF signal, the communication device 4 switches the RF unit 8 to a reception state (S6), and waits for the transmission of an Ack response packet (response packet as to the completion of reception of a packet) from the receiver (S7). When the Ack reception is completed, the communication device 4 stops the RF unit 8 (S8), and notifies the control device 3 of the completion of transmission (S9).

Next, the operation of the receiver 2 will be described. The timer 14 built in the communication device 5 in the receiver 2 measures predetermined cycles (interval period). When the measurement is completed (S11), the control circuit 12 in the communication device 5 issues a reception command to the transmission and reception circuit 27 which in turn activates the RF unit 8 in the reception state (S12).

Then the transmission and reception circuit 27 enters a standby state (S35) until actual reception of a packet (S13). While receiving the packet transmitted from the transmitter 1 (S14), the demodulator 9 demodulates the analog signal corresponding to the RF signal received by the RF unit 8, and supplies the resulting digital signal to the transmission and reception circuit 27.

In the transmission and reception circuit 27, the preamble detector 23 initially detects a preamble in the packet from the output digital signal of the demodulator 9. The preamble detector 23 supplies the notification of the detection of the preamble to the SFD detector 24. In response to the notification of the detection of the preamble, the SFD detector 24 starts to identify an SFD pattern in the output digital signal of the demodulator 9. Completing the detection of the SFD pattern, the SFD detector 24 supplies the notification of the detection of the SFD to the data length detector 25. In response to the notification of the detection of the SFD, the data length detector 25 detects an effective data length in the packet from the output digital signal of the demodulator 9. The data length detector 25 notifies the RX_FIFO 16 and the CRC detector 17 of the start of data reception. In response to the notification of the start of data reception, the RX_FIFO 16 starts taking in data from the output digital signal of the demodulator 9, and stores the data as data on the effective data section. When data is received as much as the effective data length, the data length detector 25 notifies the RX_FIFO 16 and the CRC detector 17 of the stop of data reception. The data length detector 25 further notifies the reception result determination circuit 18 of the completion of data reception. In response to the notification of the stop of data reception, the RX_FIFO 16 stops taking data in, and completes storing the data on the effective data section.

In the synchronization detection circuit 29, output digital signal from the demodulator 9 and the synchronization signal pattern stored in the synchronization pattern storing register 30 are compared by the comparator 29a. When a data pattern identical with the stored synchronization signal pattern is detected in the output digital signal of the demodulator 9, it is decided that the synchronization signal is detected. This operation of the comparator 29a corresponds to the timing signal identification step.

When the reception result determination circuit 18 acquires the CRC calculation from the CRC detector 17 along with the notification of the completion of data reception, the reception result determination circuit 18 outputs the reception completion interrupt signal, which indicates the completion of the reception of the packet, to the control circuit 12 and the synchronization detection circuit 29 (S17).

Upon receipt of the reception completion interrupt signal, the synchronization detection circuit 29 immediately generates, a timer control interrupt signal if the synchronization signal pattern is detected at that instance (S22). The timer control interrupt signal is supplied to the interval timer 28. This generation of the timer control interrupt signal corresponds to the detection signal generation step.

In the interval timer 28, a reset signal is supplied to the counter 42 from the OR circuit 41 when the timer interrupt signal is supplied to the OR circuit 41. In response to the reset signal, the counter starts counting of clock from the initial value.

Figure 11:
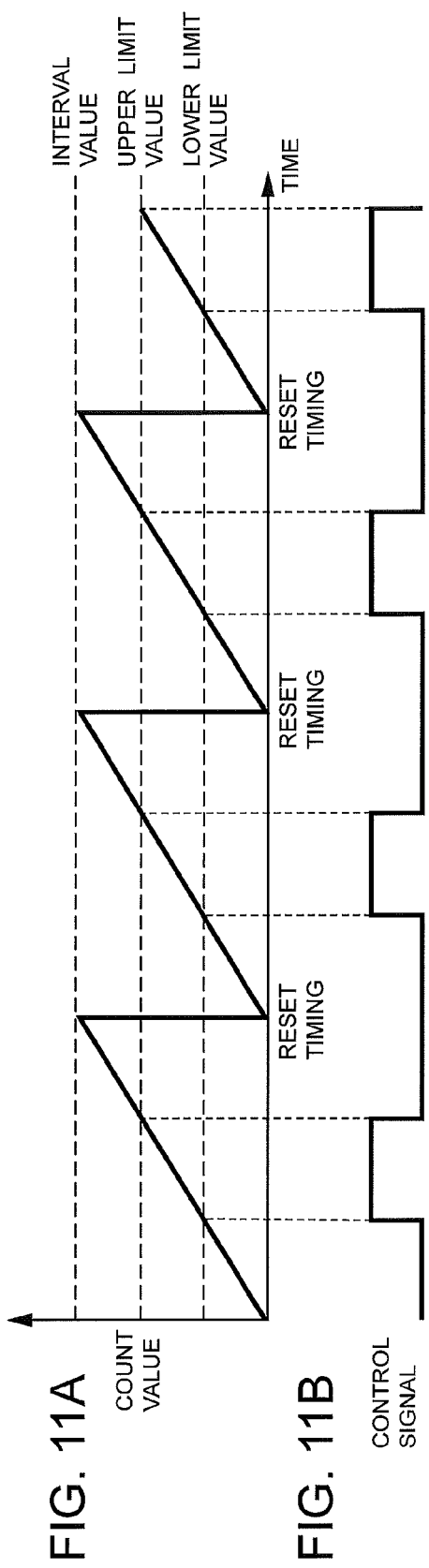
FIGS. 11A and 11B are diagrams showing the operation of the interval timer shown in FIG. 9.

When the count value of the counter 42 that is incrementing reaches the lower limit value of the lower limit register 43 as shown in FIG. 11A, the upper and lower limit comparator 46 generates the high level control signal as illustrated in FIG. 11B, and the control signal is supplied to the display device 6 via the general purpose output port 13. The display device 6 is thus controlled by the control signal supplied from the interval timer 28.

When the count value of the counter 42 is further incremented to reach the upper limit value of the upper limit register 44, the comparator 46 stops the generation of the high level control signal, to generate a low level output signal.

As shown in FIG. 11A, when the count value of the counter 42 is further incremented past the upper limit value to reach the interval value of the interval register 45, a high level timer expiration signal is generated by the interval comparator 47, and the timer expiration signal is supplied to the OR circuit 41.

The generation of the control signal corresponds to the control signal generation step. The counting operation of the counter corresponds to the count step, and the comparing operation of the comparator 46 corresponds to the upper and lower limits comparing step. The comparing operation of the interval comparator corresponds to the interval comparison step.

The OR circuit 41 supplies a reset signal to the counter 42 when either one of the timer control interrupt signal from the synchronization detection circuit 29 and the timer expiration signal from the interval comparator 47 is supplied. Consequently, if the timer control interrupt signal is supplied immediately after the supply of the timer expiration signal, the counter 42 is reset by the timer expiration signal, and subsequently the counter 42 is reset once again by the timer control interrupt signal, to restart the counting operation. When the timer control interrupt signal is supplied before the generation of the timer expiration signal, the timer control interrupt signal serves as a reset signal to reset the counter 42 before reaching the interval value, and to resume the counting operation. In other words, the operations are performed such that priority is given to the timer control interrupt signal.

When the reception of a packet is completed, the communication device 5 switches its RF unit 8 to the transmitting state (S18), and transmits an Ack response packet (S19). After the completion of the transmission of the Ack response packet, the communication apparatus stops the RF unit 8 (S20). The timer 41 built in the communication apparatus 5 measures the predetermined period once again (S21).

Figure 12:
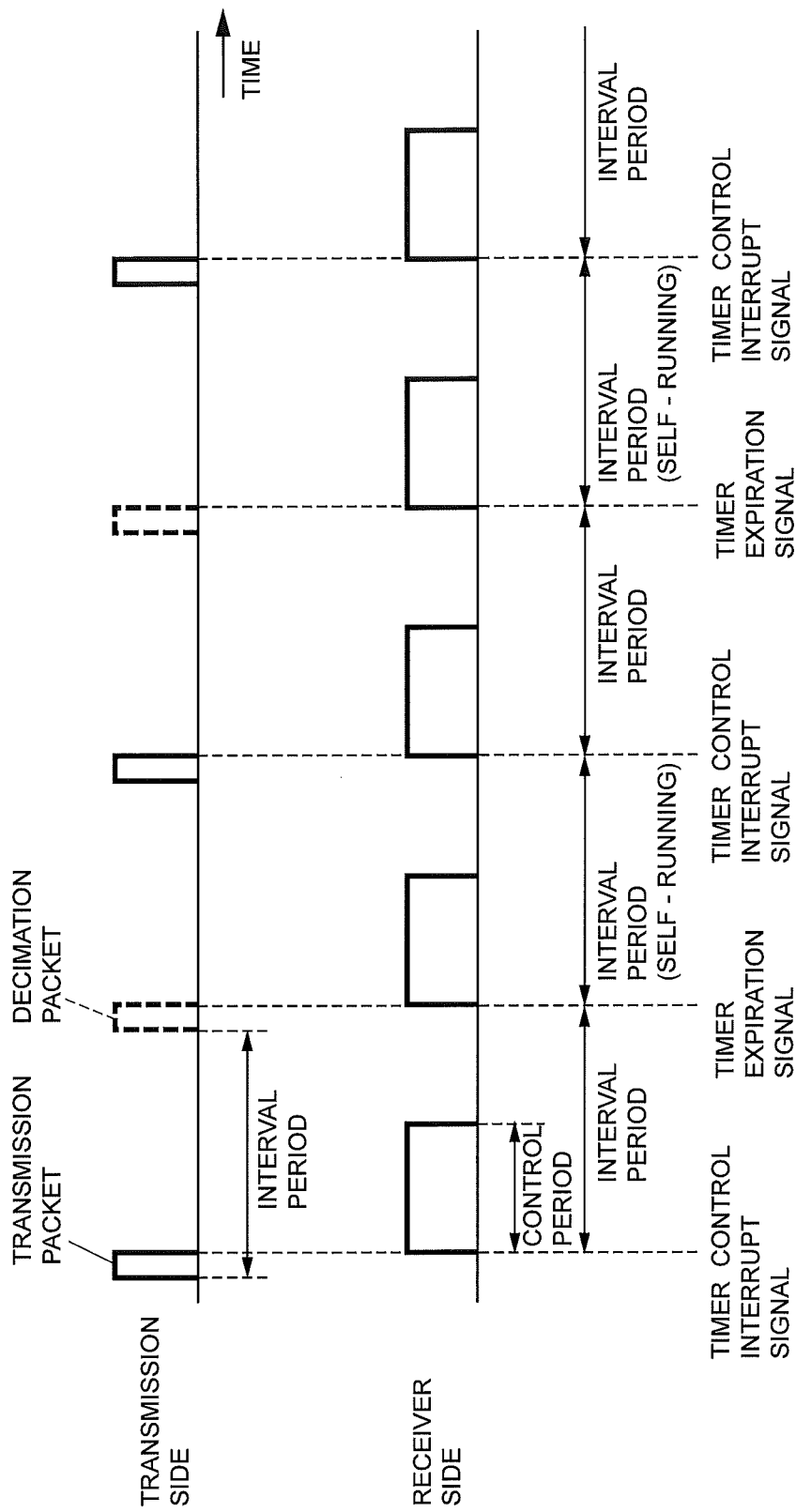
FIG. 12 is a chart showing a timing relationship between transmission packets on the transmission side and operation on the reception side, and current consumption on the reception side.

FIG. 12 schematically shows the relationship between the timing of transmission of a synchronization signal on the side of the transmitter 1 and a control period on the side of the receiver 2 in the wireless communication system according to the present invention. The control period is a period in which the counter 42 counts from the initial value to the upper limit value. On the transmitter 1 side, the interval period is counted by the built-in timer, and a packet that includes the synchronization signal as a pattern data is transmitted when the count is completed. On the receiver 2 side, after the reception of the packet, the interval timer 27 is controlled immediately in response to the detection of the synchronization signal pattern by the synchronization pattern detection circuit 29.

According to the first embodiment, the time required for the data analysis by the control circuit 12 does not exist in the receiver 2 as will be understood from FIG. 12, it is made possible to drive the interval timer 28 which counts the control period including the above-described upper limit value and the lower limit value using the timing of completion of the reception of the packet from the transmitter 1 as a reference. In this way the control signals like the shutter open and close signal are generated at accurate timings. Additionally, the low power consumption is enabled since the high speed operation of the control circuit is not necessary.

Furthermore, according to the first embodiment, basically no substantial time difference is generated between the reference timings of the transmitter 1 and the receiver 2, and the interval timer 28 performs the self running operation in which the counter 42 resumes the counting operation from the initial value in response to the timer expiration signal which is generated when the count value of the counter 42 reaches the interval value. With these features, the packet including the synchronization signal pattern from the transmitter 1 can be transmitter in a decimated way as illustrated in FIG. 12.

The notification of the detection of the SFD detection from the SFD detector 24 is supplied to the synchronization detection circuit 29. The synchronization detection circuit 29 may detect the presence of the synchronization signal pattern after locating the portion in the packet in which the synchronization signal pattern is arranged, by having the counter count clocks in response to the SFD detection notification from the SFD detector 24.

Figure 13:
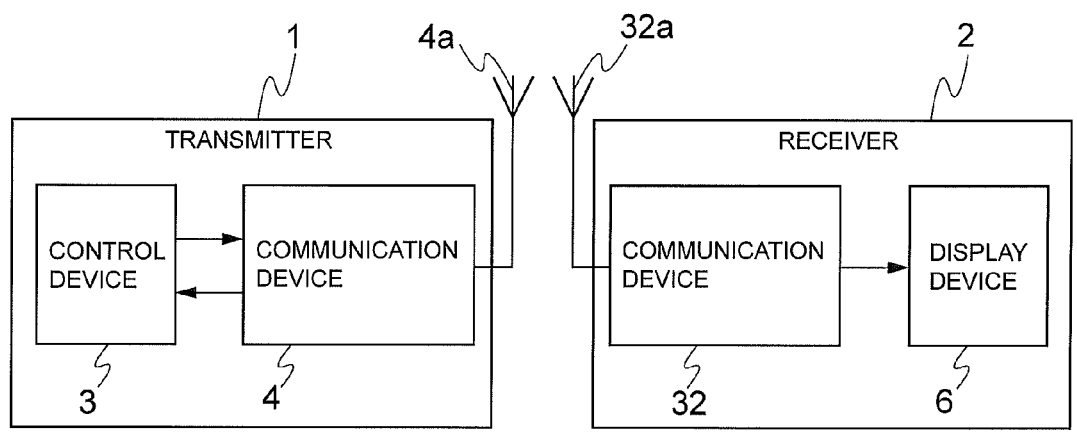
FIG. 13 is a block diagram showing the general configuration of a wireless communication system as a second embodiment of the present invention.

FIG. 13 shows a transmitter 1 and a receiver 2 that constitute a wireless communication system as a second embodiment of the present invention. As in the system of FIG. 4, the transmitter 1 includes a control device 3 and a communication device 4. The receiver 2 includes a communication device 32, and a display device 6.

Figure 14:
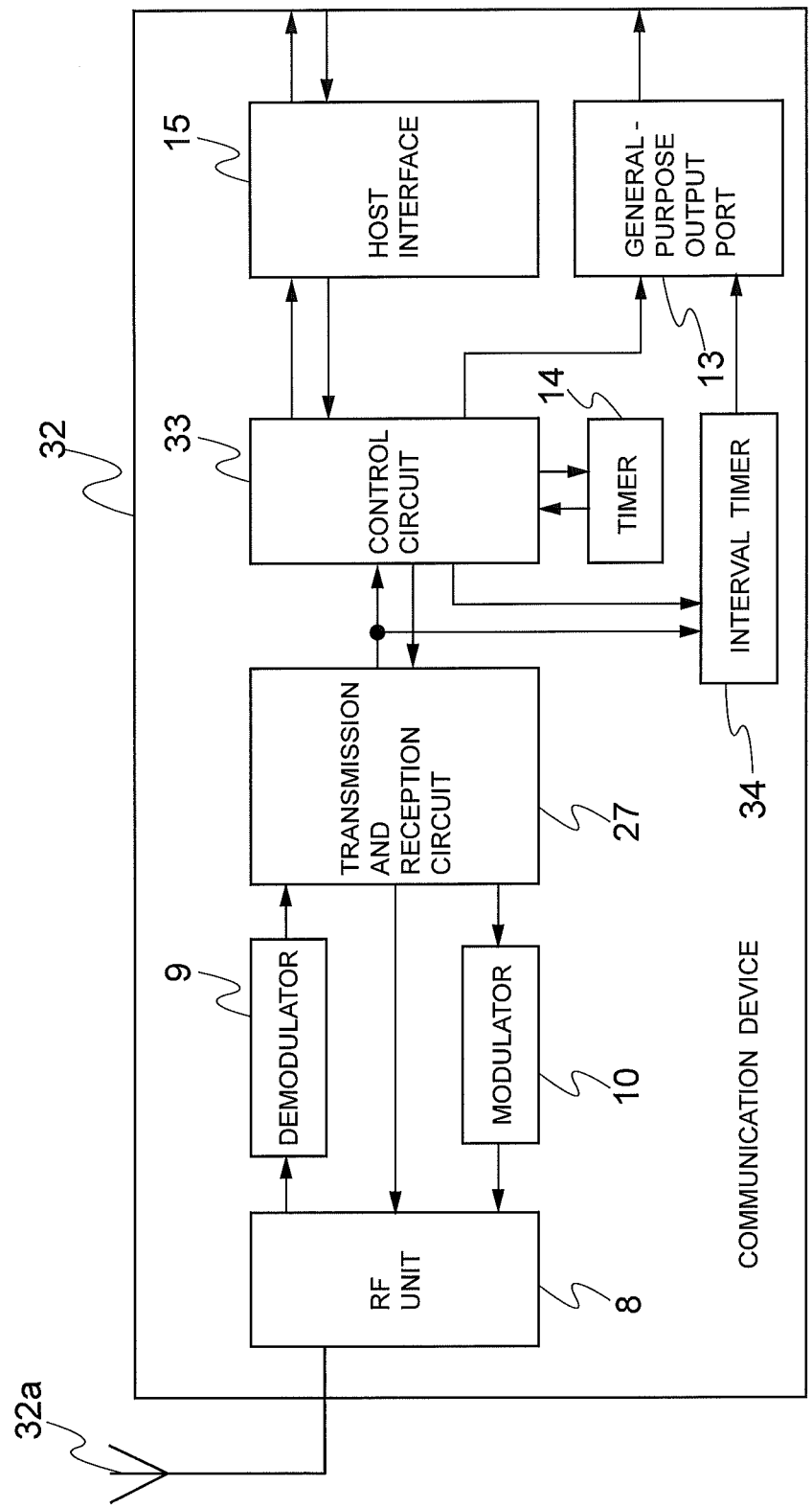
FIG. 14 is a block diagram showing the configuration of the control device included in the receiver in the system of FIG. 13.

As shown in FIG. 14, the communication device 32 includes, an RF unit 8, a demodulator 9, a modulator 10, a control circuit 33, a general purpose output port 13, a timer 14, a host interface 15, a transmission and reception circuit 27, and an interval timer 34. The RF unit 8, the demodulator 9, the modulator 10, the control circuit 33, the general purpose output port 13, the timer 14, the host interface 15, and the transmission and reception circuit 27 are the same as those included in the communication device 26 shown in FIG. 6, and the explanation thereof is omitted here. The communication device 32 has an antenna indicated at 32a.

The control circuit 33 comprises a CPU like the control circuit 12 shown in FIG. 6. The control circuit 33 inverts the level of the timer channel selection signal when a data analysis is performed and which in turn revealed that the analyzed packet is a packet including the synchronization signal in the data area, as in the conventional arrangement.

Figure 15:
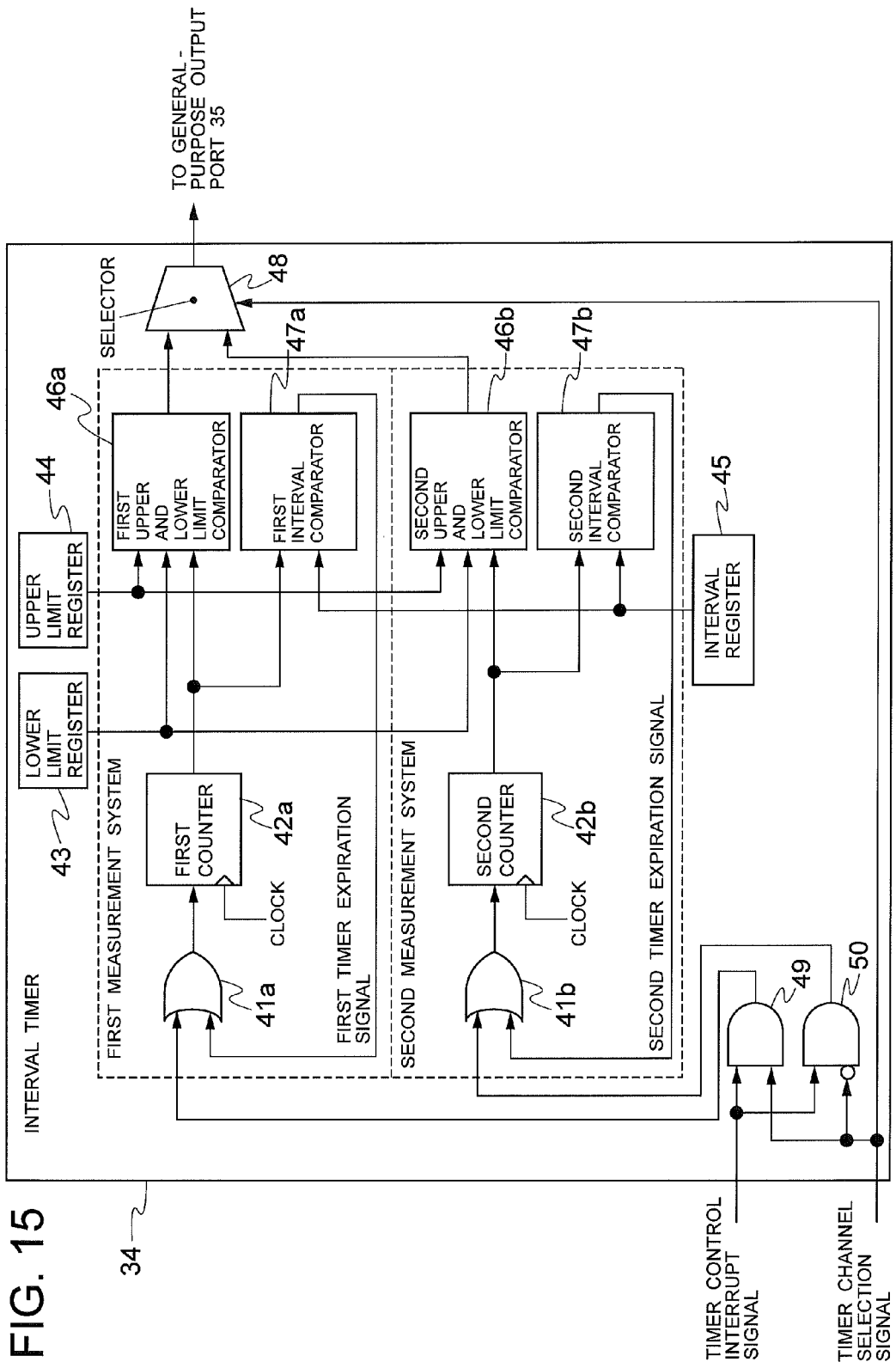
FIG. 15 is a block diagram showing the configuration of an interval timer included in the communication device of FIG. 14.

The interval timer 34 comprises OR circuits 41a and 41b, counters 42a and 42b, a lower limit register 43, an upper limit register 44, interval register 45, upper and lower limit comparators 46a and 46b, interval comparators 47a and 47b, a selector 48, and two AND circuits 49 and 50, as illustrated in FIG. 15. The OR circuit 41a, the counter 42a (first counter), the upper and lower limit comparator 46a (first upper and lower limit comparator), the interval comparator 47a (first interval comparator) constitute a first measurement system, and the OR circuit 41b, the counter 42b (second counter), the upper and lower limit comparator 46b (second upper and lower limit comparator), the interval comparator 47b (second interval comparator) constitute a second measurement system. The first and second measurement systems are configured in the similar manner as the interval timer 28 shown in FIG. 9, and the lower limit register 43, the upper limit register 44 and the interval register 45 are used commonly.

The selector 48 selects and supplies one of the output signals from the upper and lower limit comparators 46a and 46b in accordance with the level of the timer channel selection signal supplied from the control circuit 33.

The AND circuit 49 and 50 constitutes a logic circuit. The AND circuit 49 calculates a logical product of the timer control interrupt signal supplied from the synchronization detection circuit 29 in the transmission and reception circuit 27 and the timer channel selection signal supplied from the control circuit 33, and supplies a result of calculation to the OR circuit 41a. The AND circuit 50 calculates a logical product of the timer control interrupt signal supplied from the synchronization detection circuit 29 and the timer channel selection signal supplied from the control circuit 33, and supplies a result of calculation to the OR circuit 41b.

In other respects, the configuration of the wireless communication system according to the present embodiment is the same as that of the first embodiment of the wireless communication system shown in FIGS. 4, 6, and 8. Components designated by like reference numerals have the same functions as those of the conventional systems.

Next, the operation of the wireless communication system having such a configuration will be described with reference to FIGS. 16A-16G to 18. In the operational flow of the transmitter 1 and the receiver 2 shown in FIGS. 17 and 18, portions in which the same operations as those of the first embodiment are performed are designated by like reference numerals. A description of such operations will be omitted.

In the receiver 2, when the output timer channel selection signal of the control circuit 33 is at the low level, the output signal of the first measurement system of the interval timer 34 is selected by the selector 48, and the counter 42b of the second measurement system of the interval timer 34 is reset to start counting in response to the timer control interrupt signal from the synchronization detection circuit 29 in the transmission and reception circuit 27.

Conversely, when the output timer channel selection signal of the control circuit 33 is at the high level, the output signal of the second measurement system of the interval timer 34 is selected by the selector 48, and the counter 42a of the first measurement system of the interval timer 34 is reset to start counting in response to the timer control interrupt signal from the synchronization detection circuit 29 in the transmission and reception circuit 27.

Now, explanation will be made with reference to the operational waveforms shown in FIGS. 16A to 16G. As shown in FIG. 16B, the upper and lower limit comparator 46a generates a control signal at high level when the count value of the counter 42a of the first measuring system increases to reach the lower limit value of the lower limit register 43 as shown in FIG. 16A, while the output timer channel selection signal of the controller 33 is at the low level as depicted in FIG. 16F. When the count value of the counter 42a further increases to reach the upper limit value of the upper limit register 44, the comparator 46a stops the generation of the control signal at high level, to output the control signal at low level. As shown in FIG. 16G, the control signal is supplied to the selector 48 and to the display device 6 via the general purpose output port 13, so that the display device 6 is controlled by the control signal supplied from the first measuring system of the transmission and reception circuit 27. Furthermore, when the count value of the counter 42a further increases, past the upper limit value, to reach the interval value of the interval register 45, a first timer expiration signal of high level is generated by the interval comparator 47a. Since the first timer expiration signal is supplied to the OR circuit 41a, the count value of the counter 42a of the first measuring system counts up from an initial value even if the timer control interrupt signal from the synchronization detection circuit 29 is not supplied to the OR circuit 41a, and this self-running operation will be repeated.

As shown in FIG. 16C, the upper and lower limit comparator 46b generates a control signal at high level when the count value of the counter 42b of the first measuring system increases to reach the lower limit value of the lower limit register 43 as shown in FIG. 16A, while the output timer channel selection signal of the control circuit 33 is at the low level. When the count value of the counter 42b further increases to reach the upper limit value of the upper limit register 44, the comparator 46b stops the generation of the control signal at high level, to output the control signal at low level. Additionally, when the count value of the counter 42b further increases, past the upper limit value, to reach the interval value of the interval register 45, a second timer expiration signal of high level is generated by the interval comparator 47b. Since the second timer expiration signal is supplied to the OR circuit 41b, the count value of the counter 42b of the second measuring system counts up from an initial value even if the timer control interrupt signal from the synchronization detection circuit 29 is not supplied to the OR circuit 41b.

Upon receipt of the reception completion interrupt signal, the synchronization detection circuit 29 immediately generates a timer control interrupt signal if the synchronization signal pattern is detected at that instance (S31 in FIG. 17) as explained in connection with the first embodiment, and the control circuit 33 retrieves the stored data of the RX_FIFO 16 and starts to analyze the retrieved data (S32 in FIG. 17). When the timer control interrupt signal is generated as shown in FIG. 16E when the output timer channel signal of the control circuit 33 is at the low level, the timer control interrupt signal is supplied to the OR circuit 41b via the AND circuit 50, thereby resetting the count operation of the counter 42b as shown in FIG. 16C, and the counting up is resumed from the initial value.

Figure 16:
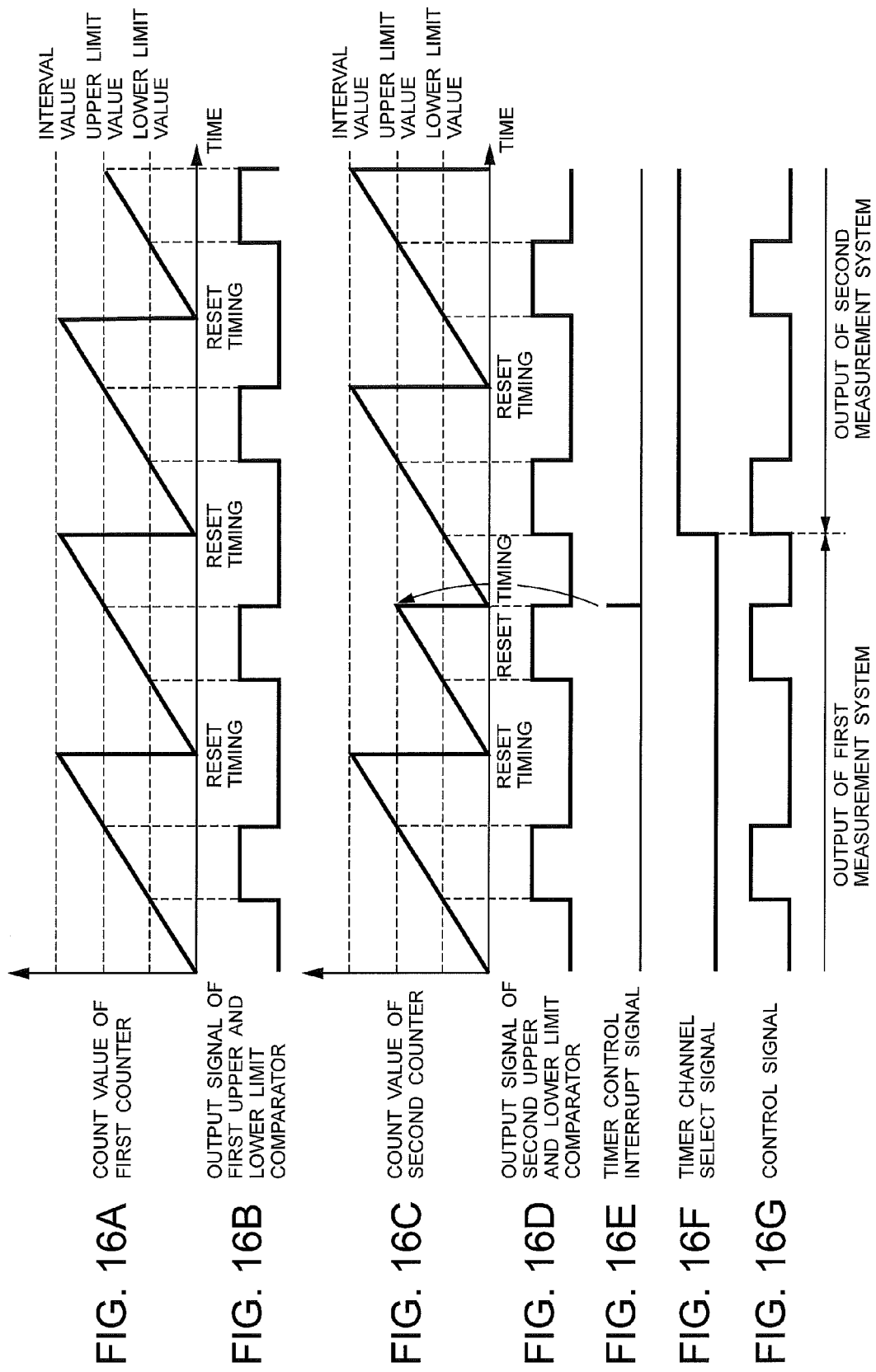
FIGS. 16A to 16G are diagrams showing the operation of the interval timer of FIG. 15.
Figure 17:
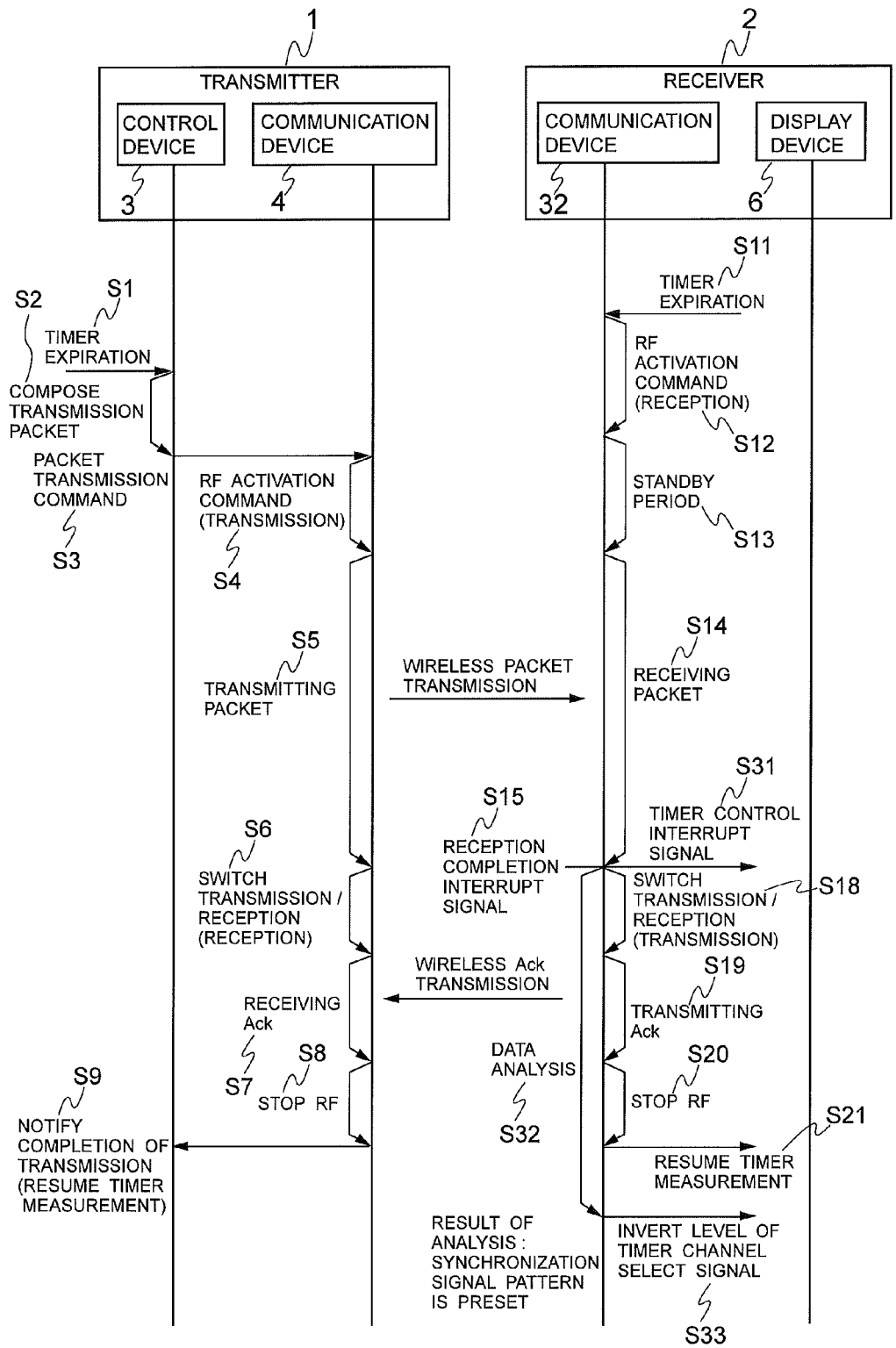
FIG. 17 is a sequence diagram showing the operation of the system of FIG. 13 when the synchronization signal pattern is present.

If it is detected, as a result of the data analysis of the control circuit 33, that the synchronization signal patter is included in the data in the received packet, the control circuit 33 inverts the level of the timer channel select signal from a low level to a high level (S33 in FIG. 17). This inversion to the high level then causes the selector to selectively supply the output signal of the second measuring system of the interval timer 34. Consequently, priority is given to the count operation of the counter 42b of the second measuring system that restarts the counting up with the count value reset in response to the timer control interrupt signal. In other words, while the output timer channel selection signal of the control circuit 33 is high, the upper and lower limit comparator 46b generates the control signal of high level as shown in (d) of FIG. 16 when the count value of the counter 42b of the second measuring system is increased to reach the lower limit value of the lower limit register 43 as depicted in FIG. 16C. When the count value of the counter 42b is further increased to reach the upper limit value of the upper limit register 44, the comparator 46b stops the generation of the control signal of high level, to output the control signal of low level. The control signal is supplied to the display device 6 via the selector 48 and the general purpose output port as depicted in FIG. 16G, so that the display device is controlled by the control signal supplied from the second measuring system of the transmission and reception circuit 27.

Figure 18:
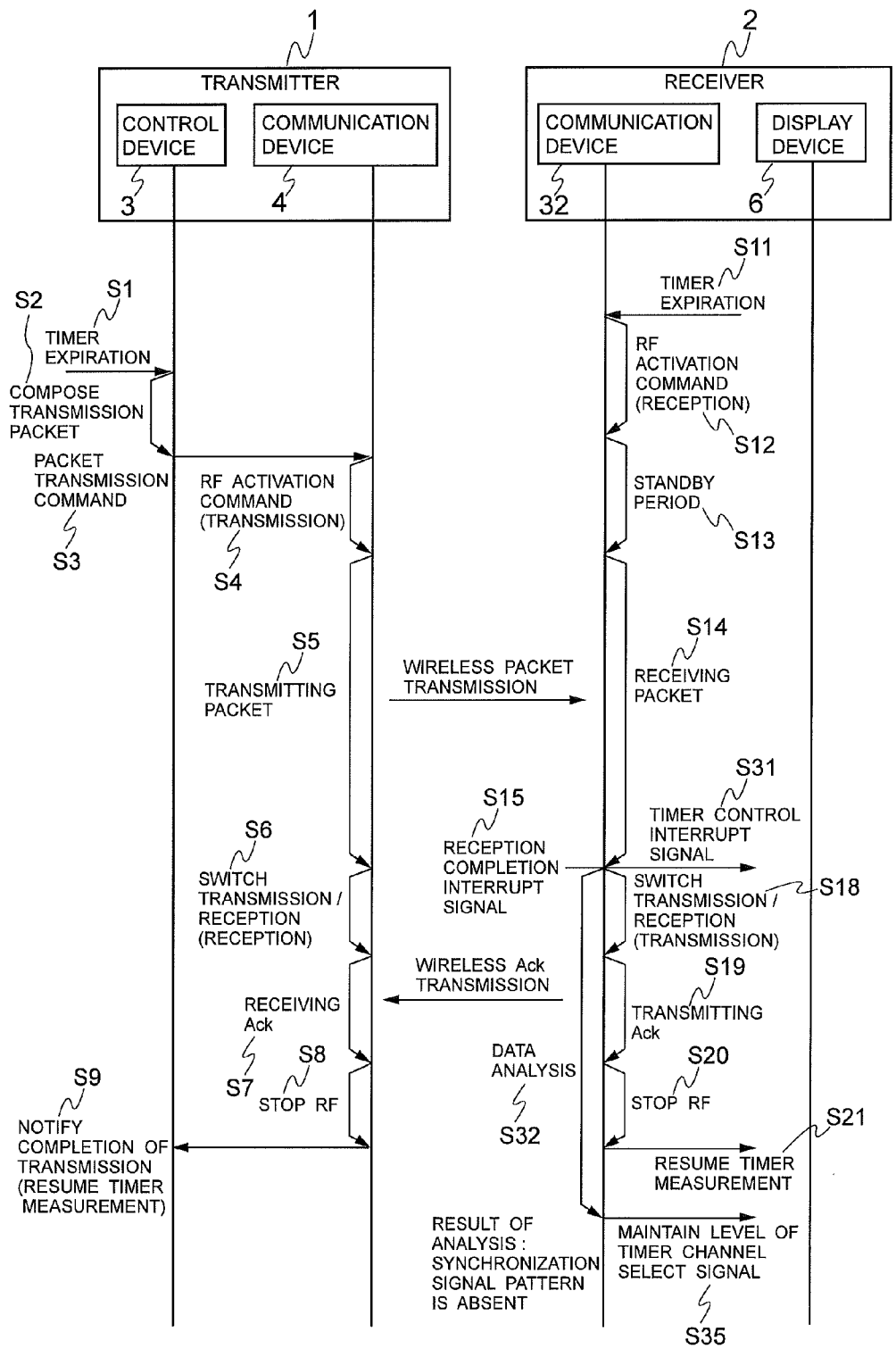
FIG. 18 is a sequence diagram showing the operation of the system of FIG. 13 when the synchronization signal pattern is absent.

If it is detected, as the result of the data analysis of the control circuit 33, that the synchronization signal patter is not included in the data in the received packet, the control circuit 33 maintains the level of the timer channel select signal without inverting it from a low level to a high level, as shown at S35 in FIG. 18). Consequently, the selector 48 continues to supply the control signal outputted from the first measuring system to the display device via the general purpose output port 13. In short, the first measuring system enters into a self-running state when the output channel selection signal of the control circuit 33 remains at the low level, so that the display device 6 is controlled in response to the output signal of the upper and lower limit comparator 46a of the first measuring system, and at the same time, the second measuring system is set in a state allowing the reception of the timer control interrupt signal from the synchronization detection circuit 29 via the AND circuit 50.

Additionally, the second measuring system enters into a self-running state when the output channel selection signal of the control circuit 33 remains at the high level, so that the display device 6 is controlled in response to the output signal of the upper and lower limit comparator 46b of the second measuring system, and at the same time, the first measuring system is set in a state allowing the reception of the timer control interrupt signal from the synchronization detection circuit 29 via the AND circuit 50.

As described above, the second embodiment features that the control signal is generated by counting clocks using the timing of completion of the reception of the packet from the transmitter 1 as a reference, and a couple of measuring systems each performing a self-running operation (the first measuring system and the second measuring system) are provided. When the control signal of one of the two measuring systems is selected by the selector 48 and supplied to the display device 6 via the general-purpose output port 13, the counting of the counter in the other of the measuring systems is reset and resumed in accordance with the timer control interrupt signal from the synchronization detection circuit 29. Thereafter, when the level of the timer channel selection signal is inverted in response to a result of data analysis by the control circuit 33 that synchronization signal pattern is included in data in the received packet, the control signal of the other measuring system is selected by the selector 48 and supplied to the display device 6 via the general-purpose output port 13. Thus, the control signal is accurately generated in synchronization with the timing of completion of the reception of the received packet even after the data analysis by the control circuit 33 confirmed that the data in the received packet includes the synchronization data pattern. Additionally, if it is not confirmed by the data analysis by the control circuit 33 that the data in the received packet includes the synchronization data pattern, it is determined that an erroneous detection of the synchronization pattern is made by the synchronization detection circuit 29, so that the selector 48 continues to select the control signal generated by the one measuring system. In this way, it is enabled to prevent the generation of the control signal at the timing of the completion of the reception of the reception packet that includes the synchronization pattern of the erroneous detection by the synchronization detection circuit 29.

According to the second embodiment, certainty in the operation of each system can be improved by preventing erroneous detection of the synchronization signal in an environment in which a plurality of wireless communication systems exist.

The foregoing embodiment has dealt with a wireless communication system in which the transmitter 1 transmits packets as a wireless signal, the packets containing a synchronization signal pattern as data, and the receiver 2 receives the packets transmitted as the wireless signal and extracts data from the packets. However, the present invention is not limited thereto and may be applied to a wired communication system in which packets are transmitted as a wired signal through transmission lines such as cables.

The foregoing embodiment has dealt with the case where the packet is transmitted every interval period. However, the present invention is note limited to this configuration. It is sufficient that the packet is intermittently transmitted from the transmitter.

Figure 19:
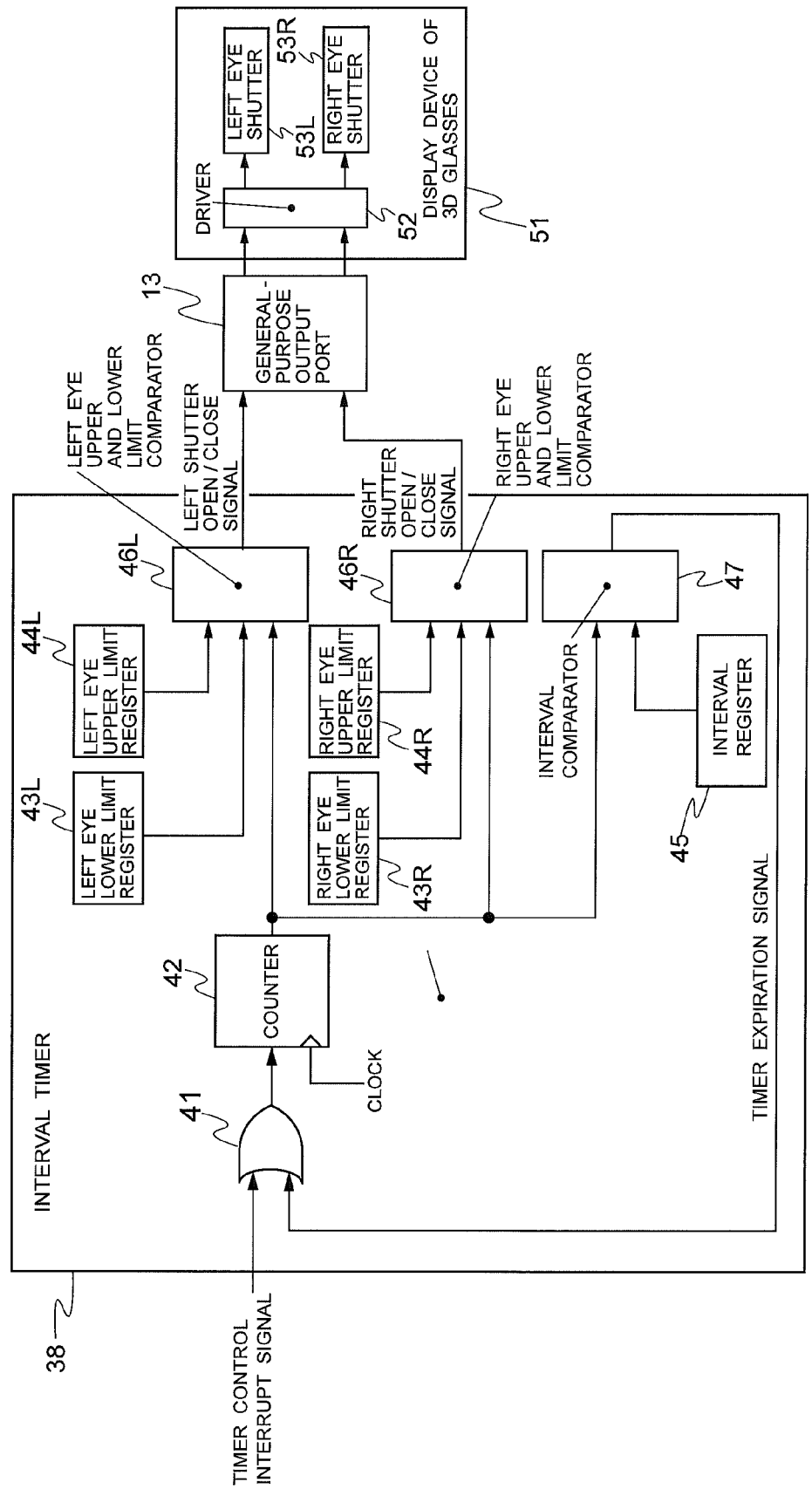
FIG. 19 is a block diagram showing a part of the internal configuration of a receiver that is provided with a display device of 3D glasses.

FIG. 19 shows a part of the internal configuration of a receiver 2 that is implemented in 3D glasses as a concrete example of the application of the present invention to a 3D video display system. The receiver 2 includes an interval timer 38 shown in FIG. 19 instead of the interval timer 28 of the communication device 26 shown in FIG. 6. The interval timer 38 includes: a left eye lower limit register 43L, a left eye upper limit register 44L, and a left eye upper and lower limit comparator 46L which correspond to a left eye shutter 53L of a display device 51 of the 3D glasses; and a right eye lower limit register 43R, a right eye upper limit register 44R, and a right eye upper and lower limit comparator 46R which correspond to a right eye shutter 53R. The other components of the interval timer 38, namely, the OR circuit 41, counter 42, interval register 45, and interval comparator 47 are the same as those of the interval timer 28.

In the configuration shown in FIG. 19, it is assumed that the count value of the counter 42 starts to increment from an initial value (0, for example) in response to the supply of the timer interrupt signal via the OR circuit 41. When the count value reaches a left eye lower limit value of the left eye lower limit register 43L, the left eye upper and lower limit comparator 46L generates a left shutter open/close signal of high level as a control signal. The left shutter open/close signal of high level is supplied to the display device 51 through the general-purpose output port 13. In response to the left shutter open/close signal, a driver 52 drives the left eye shutter 53L to open. When the count value of the counter 42 is further increased to reach a left eye upper limit value of the left eye upper limit register 44L, the left eye upper and lower limit comparator 46L stops generating the left shutter open/close signal of high level and outputs a low level. In response to the left shutter open/close signal of low level, the driver 52 stops driving the left eye shutter 53L to open, so that the left eye shutter 53L enters a closed state.

When the count value of the counter 42 exceeds the left eye upper limit value and increases further to reach a right eye lower limit value of the right eye lower limit register 43R, the right eye upper and lower limit comparator 46R generates a right shutter open/close signal of high level as a control signal. The right shutter open/close signal of high level is supplied to the display device 51 through the general-purpose output port 13. In response to the right shutter open/close signal, the driver 52 drives the right eye shutter 53R to open. When the count value of the counter 42 increases further to reach a right eye upper limit value of the right eye upper limit register 44R, the right eye upper and lower limit comparator 46R stops generating the right shutter open/close signal of high level and outputs a low level. In response to the right shutter open/close signal of low level, the driver 52 stops driving the right eye shutter 53R to open, so that the right eye shutter 53R enters a closed state.

When the count value of the counter 42 exceeds the right eye upper limit value and increases further to reach the interval value of the interval register 45, the interval comparator 47 generates a timer expiration signal of high level. The timer expiration signal is supplied to the counter 42 via the OR circuit 41, so that the counter 42 is reset to resume counting up from the initial value. The other operations are the same as in the foregoing embodiment. A further description will thus be omitted.

As described above, when the present invention is applied to a 3D video display system, the left eye shutter and the right eye shutter each can be controlled to open and close without delay with reference to the timing of the completion of packet reception (timer control interrupt signal), when the presence of the synchronization signal pattern is recognized in the synchronization detection circuit 28 while receiving packets from the transmitter. The communication device need not include a control circuit that makes high-speed operations for identifying the presence of a synchronization signal pattern in a received packet by data analysis after the completion of the reception of the packet. This allows a reduction in power consumption.

The communication device, the control signal generation method, the shutter glasses, and the communication system according to the present invention are not limited to the configuration of the foregoing embodiment. Other elements and/or methods may be further added. The foregoing embodiment has dealt with the case where the device to be controlled is a display device which includes shutters for providing display in synchronization with the reference timing signal transmitted from the transmitter. However, the present invention is not limited thereto, and may be applied to other devices that operate on the receiver side in synchronization with a reference timing signal transmitted from a transmitter.

This application is based on Japanese Patent Application No. 2011-078041 which is incorporated herein by reference.

What is claimed is:

1. A communication device, comprising:
    a demodulating part which demodulates received data into a demodulated signal;
    a transmission and reception part which generates a first output signal and a timing detection signal in response to said demodulated signal;
    a control part which receives said first output signal and performs control of said communication device;
    a control signal generating part which receives said timing detection signal and generates a control signal for a controlled device on the basis of said timing detection signal,
    wherein said transmission and reception part includes a reception unit which receives said demodulated signal, said reception unit including
        a preamble detector which detects a preamble of a packet in said demodulated signal that includes said data and which generates a preamble detection notification,
        an SFD (start frame delimiter) detector which detects an SFD of said packet in response to said preamble detection notification and generates an SFD detection notification,
        a data length detector which detects an effective length of said packet in response to said SFD detection notification and which generates a data reception start notification at a timing of completion of effective data of said packet,
        a timing signal identifying part which identifies whether or not a predetermined reference timing signal pattern is present in said demodulated signal, and
        a detection signal outputting part which outputs said timing detection signal when said timing signal identifying part identifies said predetermined reference timing signal pattern as being present.

2. The communication device according to claim 1, wherein said timing signal identifying part comprises:
    a reference timing signal pattern storing part which stores beforehand said predetermined reference timing signal pattern;
    a comparing part which identifies whether or not said predetermined reference timing signal pattern exists in said packet by comparing, during reception of said packet, said data in said packet with said predetermined reference timing signal pattern stored in said reference timing signal pattern storing part.

3. The communication device according to claim 1, wherein said control signal generating part comprises:
    a counter which counts the clock from an initial value in response to said timing detection signal,
    an upper and lower limit comparator which generates said control signal when the count value of said counter reaches a lower limit value greater than the initial value, and stops generating said control signal when the count value of said counter reaches an upper limit value greater than the lower limit value, and
    an interval comparator which resumes counting of said counter by reverting the count value of said counter to said initial value if the count value of said counter reaches an interval value greater than the upper limit value.

4. The communication device according to claim 1, wherein after reception of said packet is completed, said control part generates a channel selection signal which inverts its level each time when it is detected, by analyzing the data in said packet, that the predetermined reference timing signal pattern is included in the data, and
wherein said control signal generating part comprises
    a first counter which counts the clock from an initial value,
    a first upper and lower limit comparator which generates said control signal when the count value of said first counter reaches a lower limit value greater than the initial value, and stops generating said control signal when the count value of said first counter reaches an upper limit value greater than the lower limit value,
    a first interval comparator which causes said first counter to resume its counting operation with said initial value if the count value of said first counter reaches an interval value greater than the upper limit value,
    a second counter which counts the clock from said initial value,
    a second upper and lower limit comparator which generates said control signal when the count value of said second counter reaches a lower limit value greater than the initial value, and stops generating said control signal when the count value of said second counter reaches an upper limit value greater than the lower limit value, a second interval comparator which causes said second counter to resume its counting operation with said initial value if the count value of said second counter reaches the interval value, a selector which outputs the control signal outputted from the first upper and lower limit comparator when said channel selection signal is at a low level, and outputs the control signal outputted from the second upper and lower limit comparator when said channel selection signal is at a high level, and a logic circuit which causes said second counter to resume its counting operation with said initial value in accordance with said timing detection signal when said channel selection signal is at a low level, and causes said first counter to resume its counting operation with said initial value in accordance with said timing detection signal when said channel selection signal is at a high level.

5. The communication device according to claim 1, comprising:

a radio frequency unit which receives a wireless signal and outputs a reception signal in a reception state, and transmits a transmission signal to be transmitted as a wireless signal in a transmission state;

a demodulator which demodulates the reception signal received by said radio frequency unit into a digital signal;

a modulator which modulates transmission data in units of packets into the transmission signal;

a transmission system circuit which supplies transmission data to the modulator in the units of packets; and a control circuit which controls said radio frequency unit and said transmission circuit.

6. The communication system according to claim 5, wherein said timing signal identifying part and said detection signal generating part are included in a reception system circuit which performs data processing on an output digital signal of the demodulator in units of packets, and wherein the control circuit additionally controls said reception system circuit.

7. The communication system according to claim 6, wherein said reception system circuit comprises:

a data storing part which stores the effective data of said packet by starting storing of said digital signal in response to said data reception start notification and completing the storing of said digital signal in response to said data reception completion notification;

a CRC detector which calculates a CRC value of data stored in said data storing part in response to said data reception start notification and said data reception completion notification; and a reception result determination circuit which determines whether said CRC value calculated by said CRC detector is correct or not in response to said data reception completion notification and, generates and supplies a reception completion interrupt signal as a signal indicating a timing of said reception completion to said detection signal generating means if said CRC value is determined to be correct.

8. The communication device according to claim 1, wherein at least said timing signal identifying part, said control signal generating means, and said control part are formed integrally in a semiconductor chip.

9. A control signal generating method for generating a control signal for a controlled device in a communication device, said controlled device control signal generating method comprising:

a receiving step for receiving a packet;

a demodulating step for demodulating the data in the received packet into a demodulated signal;

a first output signal generating step for generating a first output signal in response to said demodulated signal;

a preamble detecting step for detecting a preamble of the packet in said demodulated signal that includes said data and generating a preamble detection notification;

an SFD (start frame delimiter) detecting step for detecting an SFD of said packet in response to said preamble detection notification and generating an SFD detection notification;

a data length detecting step for detecting an effective length of said packet in response to said SFD detection notification and generating a data reception start notification at a timing of completion of effective data of said packet;

a timing signal identifying step for identifying whether or not a predetermined reference timing signal pattern is present in said demodulated signal; and a detection signal generating step for generating a timing detection signal when said timing signal identifying step identifies said predetermined reference timing signal pattern as being present; and a control signal generating step for generating the control signal for said controlled device at such a timing based on the completion of reception of the packet, under a condition such that said predetermined reference timing signal pattern is identified as being present.

10. The control signal generating method according to claim 9, wherein said control signal generating step comprises:

a counting step for counting the clock from an initial value in response to said timing detection signal, an upper and lower limit comparing step for generating said control signal when the count value of said counting step reaches a lower limit value greater than the initial value, and stopping generating said control signal when the count value of said counting step reaches an upper limit value greater than the lower limit value, and an interval comparing step for resuming counting of said counting step by reverting the count value of said counting step to said initial value if the count value of said counting step reaches an interval value greater than the upper limit value.

11. The control signal generating method according to claim 9, further comprising a step for generating, after reception of said packet is completed, a channel selection signal which inverts its level each time when it is detected, by analyzing the data in said packet, that the predetermined reference timing signal pattern is included in the data, and wherein said control signal generating step comprises a first counting step for counting the clock from an initial value, a first upper and lower limit comparing step for generating said control signal when the count value of said first counter reaches a lower limit value greater than the initial value, and stopping generating said control signal when the count value of said first counter reaches an upper limit value greater than the lower limit value, a first interval comparing step for resuming counting of said first counting step with said initial value if the count value of said first counter reaches an interval value greater than the upper limit value, a second counting step for counting the clock from said initial value, a second upper and lower limit comparing step for generating said control signal when the count value of said second counter reaches a lower limit value greater than the initial value, and stopping generating said control signal when the count value of said second counter reaches an upper limit value greater than the lower limit value, a second interval comparing step for resuming counting of said second counting step with said initial value if the count value of said second counter reaches the interval value, a selecting step for outputting the control signal outputted in the first upper and lower limit comparing step when said channel selection signal is at a low level, and outputting the control signal outputted in the second upper and lower limit comparing step when said channel selection signal is at a high level, and a logic step for resuming said second counting step with said initial value in accordance with said timing detection signal when said channel selection signal is at a low level, and resuming said first counting step with said initial value in accordance with said timing detection signal when said channel selection signal is at a high level.

12. A communication device, comprising:

a demodulating part which demodulates a received signal into a digital signal;

a data processing part which acquires said digital signal from said demodulating part and extracts data in said digital signal;

a timing signal identifying part which acquires said digital signal from said demodulating part and identifies whether or not a predetermined reference timing signal pattern is present in said data;

a detection signal generating part which generates a timing detection signal upon completion of reception of a packet including said data when said timing signal identifying part identifies that the predetermined reference timing signal pattern is present; and a control signal generating part which generates a control signal for a controlled device at a timing based on the completion of reception of the signal, under a condition such that said predetermined reference timing signal pattern is identified as being present, wherein said data processing part and said timing signal identifying part operate respectively in response to said demodulating part.

13. The communication device according to claim 12, wherein said packet includes effective data, and wherein said data processing part comprises:

a preamble detector which detects a preamble of said packet in said digital signal and generates a preamble detection notification;

an SFD detector which detects an SFD of said packet in said digital signal in response to said preamble detection notification and generates an SFD detection notification;

a data detector which detects an effective length of said packet in said digital signal in response to said SFD detection notification and generates a data reception start notification at a timing of start of the effective data of said packet and generates a data reception completion notification at a timing of completion of the effective data of said packet;

a data storing part which stores the effective data of said packet by starting storing of said digital signal in response to said data reception start notification and completing the storing of said digital signal in response to said data reception completion notification;

a CRC detector which calculates a CRC value of data stored in said data storing part in response to said data reception start notification and said data reception completion notification; and a reception result determination circuit which determines whether said CRC value calculated by said CRC detector is correct or not in response to said data reception completion notification and generates and supplies a reception completion interrupt signal as a signal indicating a timing of said reception completion to said detection signal generating means if said CRC value is determined to be correct.

14. The communication device according to claim 13, wherein said timing signal identifying part comprises:

a reference timing signal pattern storing part which stores beforehand said predetermined reference timing signal pattern; and a comparing part which identifies whether or not said predetermined reference timing signal pattern exists in said digital signal by comparing said digital signal with said predetermined reference timing signal pattern stored in said reference timing signal pattern storing part.

15. The communication device according to claim 14, wherein said comparing part identifies whether or not said predetermined reference timing signal pattern exists in said digital signal on the basis of said digital signal supplied from said demodulating part and said reference timing signal pattern and said SFD detection notification.

16. The communication device according to claim 1, wherein after reception of said packet is completed, said control part generates a channel selection signal which inverts its level each time when it is detected, by analyzing the data in said packet, that the predetermined reference timing signal pattern is included in the data, and wherein said control signal generating part comprises a first measurement system which counts the clock from an initial value, and generates a first count value, and generates said control signal when the first count value reaches a lower limit value greater than the initial value, and stops generating said control signal when the first count value reaches an upper limit value greater than the lower limit value, and resumes counting operation with said initial value if the first count value reaches an interval value greater than the upper limit value, a second measurement system which counts the clock from said initial value, and generates a second count value, and generates said control signal when the second count value reaches the lower limit value greater than the initial value, and stops generating said control signal when the second count value reaches the upper limit value greater than the lower limit value, and resumes counting operation with said initial value if the second count value reaches the interval value, a selector which outputs the control signal outputted from the first upper and lower limit comparator when said channel selection signal is at a low level, and outputs the control signal outputted from the second upper and lower limit comparator when said channel selection signal is at a high level, and a logic circuit which causes said second measurement system to resume its counting operation with said initial value in accordance with said timing detection signal when said channel selection signal is at a low level, and causes said first measurement system to resume its counting operation with said initial value in accordance with said timing detection signal when said channel selection signal is at a high level.

17. A communication device, comprising:

a timing signal identifying part which identifies whether or not a predetermined reference timing signal pattern is present in said data;

a detection signal generating part which generates a timing detection signal upon completion of reception of a packet that includes said data when said timing signal identifying part identifies said predetermined reference timing signal pattern as being present;

a control signal generating part which generates a control signal for a controlled device at a timing set based on the completion of reception of the packet on the basis of the timing detection signal; and a control part which performs control of said communication device, wherein after reception of said packet is completed, said control part generates a channel selection signal which inverts its level each time when it is detected, by analyzing the data in said packet, that the predetermined reference timing signal pattern is included in the data, and wherein said control signal generating part comprises a first measurement system which counts the clock from an initial value, and generates a first count value, and generates said control signal when the first count value reaches a lower limit value greater than the initial value, and stops generating said control signal when the first count value reaches an upper limit value greater than the lower limit value, and resumes counting operation with said initial value if the first count value reaches an interval value greater than the upper limit value, a second measurement system which counts the clock from said initial value, and generates a second count value, and generates said control signal when the second count value reaches the lower limit value greater than the initial value, and stops generating said control signal when the second count value reaches the upper limit value greater than the lower limit value, and resumes counting operation with said initial value if the second count value reaches the interval value, a selector which outputs the control signal outputted from the first upper and lower limit comparator when said channel selection signal is at a low level, and outputs the control signal outputted from the second upper and lower limit comparator when said channel selection signal is at a high level, and a logic circuit which causes said second measurement system to resume its counting operation with said initial value in accordance with said timing detection signal when said channel selection signal is at a low level, and causes said first measurement system to resume its counting operation with said initial value in accordance with said timing detection signal when said channel selection signal is at a high level.

* * * * *